(12) United States Patent
Stuan et al.

(10) Patent No.: US 11,115,625 B1
(45) Date of Patent: Sep. 7, 2021

(54) POSITIONAL AUDIO METADATA GENERATION

(71) Applicant: Cisco Technology, Inc., San Jose, CA (US)

(72) Inventors: Øivind Stuan, Løten (NO); Johan Ludvig Nielsen, Sør-Fron (NO)

(73) Assignee: CISCO TECHNOLOGY, INC., San Jose, CA (US)

(*) Notice: Subject to any disclaimer, the term of this patent is extended or adjusted under 35 U.S.C. 154(b) by 0 days.

(21) Appl. No.: 17/120,964

(22) Filed: Dec. 14, 2020

(51) Int. Cl.
 *H04N 7/15* (2006.01)
 *H04R 3/00* (2006.01)
 *H04N 7/14* (2006.01)

(52) U.S. Cl.
 CPC ............ *H04N 7/15* (2013.01); *H04N 7/142* (2013.01); *H04N 7/147* (2013.01); *H04R 3/005* (2013.01)

(58) Field of Classification Search
 CPC ... H04N 7/15; H04N 7/14; H04R 3/00; G06K 9/00221
 USPC ............................................ 348/14.01–14.16
 See application file for complete search history.

(56) References Cited

U.S. PATENT DOCUMENTS

| | | |
|---|---|---|
| 7,154,526 B2 | 12/2006 | Foote et al. |
| 7,586,513 B2 | 9/2009 | Muren et al. |
| 8,509,454 B2 | 8/2013 | Kirkeby et al. |
| 8,537,195 B2 | 9/2013 | Duckworth et al. |
| 8,797,376 B2 | 8/2014 | Saleh et al. |
| 8,842,161 B2 | 9/2014 | Feng et al. |
| 9,215,543 B2 | 12/2015 | Sun et al. |
| 9,491,405 B2 | 11/2016 | Zhou |
| 9,554,091 B1 | 1/2017 | Malegaonkar et al. |
| 9,674,453 B1* | 6/2017 | Tangeland ............. H04N 5/232 |
| 9,723,260 B2 | 8/2017 | Feng |

(Continued)

FOREIGN PATENT DOCUMENTS

WO  2017143910 A1  8/2017

OTHER PUBLICATIONS

Plantronics, Inc., "3D Voice", https://www.poly.com/us/en/innovations/3d-voice, downloaded Sep. 10, 2020, 2 pages.

(Continued)

*Primary Examiner* — Melur Ramakrishnaiah
(74) *Attorney, Agent, or Firm* — Edell, Shapiro & Finnan, LLC

(57) ABSTRACT

At a video conference endpoint including a camera, a microphone array, and one or more microphone assemblies, the video conference endpoint may divide a video output of the camera into one or more tracking sectors and detect a head position for each participant in the video output. The video conference endpoint may determine within which tracking sector each detected head position is located. The video conference endpoint may determine active sound source positions of the actively speaking participants based on sound being detected or captured by the microphone array and microphone assemblies, and may determine within which tracking sector the active sound source positions are located. For each tracking sector that contains an active sound source position, the video conference endpoint may update the positional audio metadata for that particular tracking sector based on the active sound source positions and the detected head positions located in that tracking sector.

20 Claims, 14 Drawing Sheets

(56) References Cited

U.S. PATENT DOCUMENTS

| | | | |
|---|---|---|---|
| 9,942,513 | B1 | 4/2018 | Aarrestad et al. |
| 9,980,040 | B2 | 5/2018 | Whyte et al. |
| 10,091,412 | B1* | 10/2018 | Feng ............... H04N 7/147 |
| 10,122,972 | B2 | 11/2018 | Feng |
| 10,362,270 | B2 | 7/2019 | Goesnar et al. |
| 10,440,322 | B2 | 10/2019 | Aarrestad et al. |
| 10,516,852 | B2 | 12/2019 | Theien et al. |
| 10,598,543 | B1 | 3/2020 | Mansour et al. |
| 2004/0114772 | A1 | 6/2004 | Zlotnick |
| 2010/0328419 | A1 | 12/2010 | Etter |
| 2013/0100236 | A1* | 4/2013 | Zhan ............... H04M 3/567 |
| | | | 348/14.07 |
| 2014/0240447 | A1 | 8/2014 | Cartwright et al. |
| 2015/0221319 | A1 | 8/2015 | Cartwright et al. |
| 2015/0243200 | A1 | 8/2015 | Pan |
| 2015/0271593 | A1 | 9/2015 | Sun et al. |
| 2015/0288824 | A1 | 10/2015 | Quiers |
| 2016/0065828 | A1 | 3/2016 | Lee |
| 2017/0150099 | A1 | 5/2017 | Duckworth et al. |
| 2019/0369951 | A1 | 12/2019 | Reiger et al. |
| 2020/0177837 | A1* | 6/2020 | Dickins ............ H04N 7/147 |

OTHER PUBLICATIONS

De Bruijn, "Application of Wave Field Synthesis in Videoconferencing," TU Delft, Delft University of Technology, Oct. 2004, 272 pages.

Eskow, "The Art of Audio Mixing for Sports," http://www.tvtechnology.com/news/0002/the-art-of-audio-mixing-for-sports/277456, Nov. 18, 2015, 3 pages.

Herre, et al., "MPEG-H Audio—The New Standard for Universal Spatial/3D Audio Coding," Journal of the Audio Engineering Society, vol. 62, No. 12, Dec. 2014, 12 pages.

N. Matsuo, et al., "Speaker Position Detection System Using Audio-visual Information", UDC 621.397.3:801.41, FUJITSU Sci. Tech. J., 35, 2, pp. 212-220, Dec. 1999, 9 pages.

"RealPresence Group Series", Group Video Conference—Polycom RealPresence Group Conferencing, Polycom, Inc., http://www.polycom.co.in/products-services/hd-telepresence-video-conferencing/realpresence-room/realpresence-group-series.html, downloaded from the internet on Jul. 19, 2016, 16 pages.

Trond F. Bergh, "Speaker Tracking Based on Face Detection and Voice Activity Detection Using a Microphone Array", 2 pages.

* cited by examiner

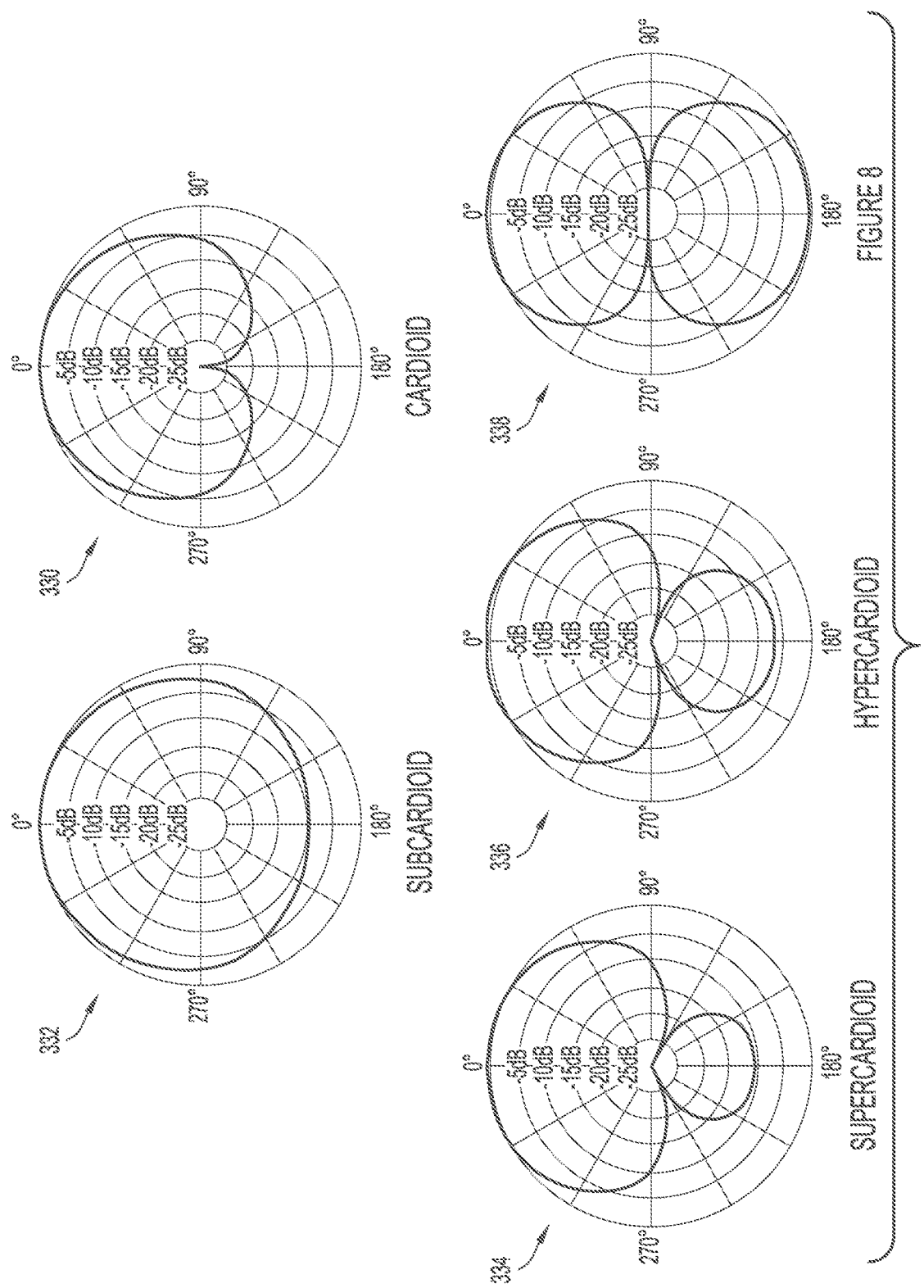

POSITIONAL AUDIO METADATA GENERATION

TECHNICAL FIELD

The present disclosure relates to the generation of positional audio metadata to support spatial audio playback.

BACKGROUND

A video conference session may involve a first video conference endpoint that transmits video and sound or audio of participants engaged in a discussion to a second video conference endpoint. When the video and audio are output by the second video conference endpoint, the spatial positioning of the audio output may not match what is shown in the video output. Thus, a participant (i.e., remote participant) at the second video conference endpoint may have difficulty discerning which participant local to the first video conference endpoint is talking at any given time. Thus, the remote participant has to rely on visual clues in the transmitted video that might indicate who is talking, but which visual clues may be absent or incomplete. As a result, the remote participant may not feel fully present or immersed in the discussion.

BRIEF DESCRIPTION OF THE DRAWINGS

FIG. 3B is a diagram of various polar patterns utilized by the directional microphones of the directional microphone assembly illustrated in FIG. 3A.

DESCRIPTION OF EXAMPLE EMBODIMENTS

Overview

Figure 1:
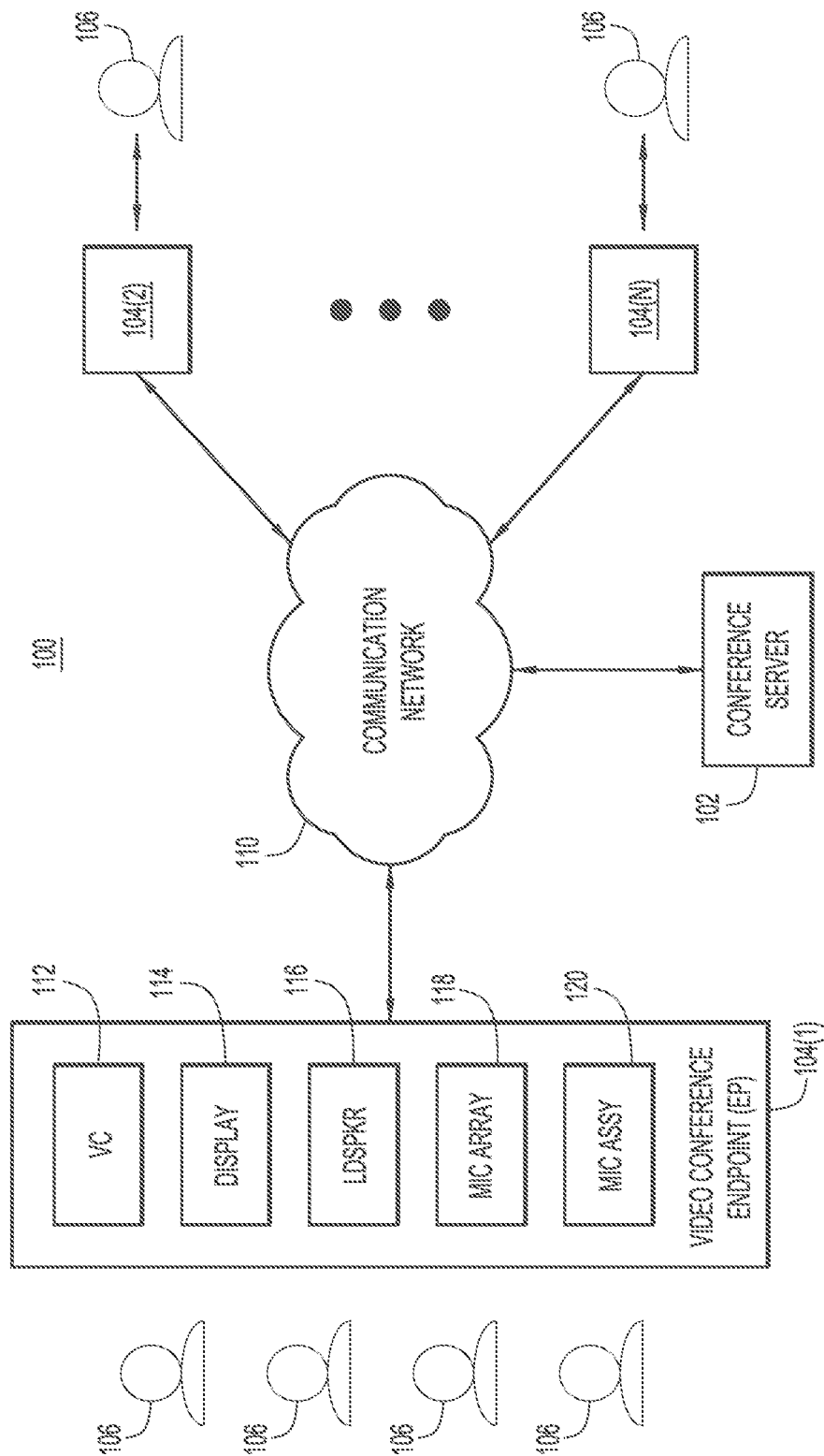
FIG. 1 is a block diagram of a video conference (e.g., teleconference) environment in which embodiments directed the generation of positional audio metadata to support spatial audio playback may be implemented, according to an example embodiment.

Techniques presented herein relate to generating positional audio/sound metadata for multiple participants in a video conference meeting between two or more video conference endpoints in order to support spatial audio playback that matches the positioning of the sound source to what is shown on a corresponding video output. The video conference endpoint may include one or more display devices, one or more loudspeakers, one or more cameras, and one or more microphone arrays, and each one of these components may have a predetermined spatial relationship with respect to one another. The video conference endpoint may further include one or more microphone assemblies that may disposed on a table or at some other location within a conference room or conference environment in which the video conference endpoint is disposed. The video conference endpoint may be configured to divide a video output of the camera of the video conference endpoint into one or more tracking sectors, and to detect a head position for each participant of one or more participants in the video output of the camera. The video conference endpoint may be further configured to determine, for each detected head position, the tracking sector of the one or more tracking sectors within which the detected head position is located. The video conference endpoint may then be configured to determine one or more active sound source positions of one or more actively speaking participants of the one or more participants based on sound from the one or more actively speaking participants being captured or detected by a microphone array of the video conference endpoint, and determine the tracking sector of the one or more tracking sectors within which the one or more active sound source positions are located. If any of the one or more of the active sound source positions are located in the tracking sector, the video conference endpoint may update positional audio metadata for the tracking sector based on the one or more active sound source positions located in the tracking sector and the detected head positions located within the tracking sector.

Example Embodiments

During a video conference session, a video conference endpoint captures audio and video of nearby participants and transmits the captured information to a remote location. Some video conference endpoints may be configured to symmetrically divide a room into sectors with regard to the camera field of view (e.g., a left half of the video feed and a right half of the video feed). These video conference endpoints attempt to match the position of audio sources with what is shown in the video output. However, when the video and audio are output by these video conference endpoints, the spatial positioning of the audio output may not match what is shown in the video output when multiple audio sources are present. When the audio is recorded as a monaural mix located a substantial distance from the users and played back using the tracking metadata from the far end video conference endpoint, the effect at the listening end (e.g., far-end video conference endpoint) can be jarring. This is because the sound generated by participants located on each side of the table may "jump" to the opposing side of the table as participants on the opposing side of the table take over the role as the most active tracked sound source. The use of directional microphones simplifies the capturing of the sound by reducing the amount of sound captured from sources other than the ones in the direction of interest (i.e., assuming that the microphone has been appropriately positioned relative to the sound source of interest). Assuming that more than one channel of audio can be transmitted simultaneously from a video conference endpoint, this allows for the division of the scene into multiple tracking sectors, which, in turn, opens up the ability to reduce the maximum distance a sound source may "jump" to be within the confines of a specific tracking sector. Thus, the use of microphone assemblies (and in some instances microphone assemblies equipped with one or more directional microphones) that are located in closer proximity to the audio sources allows for a more responsive updating of the positional audio metadata than simply utilizing a microphone array associated with or in the camera. Accordingly, embodiments presented herein, and described below, generate positional audio metadata that allows for a spatial audio playback experience that more accurately reflects the actual sound source locations as seen on screen.

With reference to FIG. 1, there is depicted a block diagram of a video conference (e.g., teleconference) environment 100 in which embodiments directed to the generation and/or use of positional audio metadata to support spatial audio playback capabilities by a video conference endpoint. Video conference environment 100 includes a conference server 102 and video conference endpoints 104(1)-104(N) (collectively "endpoints 104") operated by local users/participants 106 and configured to establish audio-visual teleconference collaboration sessions with each other over a communication network 110. Communication network 110 may include one or more wide area networks (WANs), such as the Internet, and one or more local area networks (LANs). The conference server 102 may also be deployed to coordinate the routing of audio-video streams among the video conference endpoints.

Each video conference endpoint 104 (i.e., endpoint 104(1)) may include a video camera (VC) 112, a display device 114, loudspeakers (LDSPKRS) 116, a microphone array (MIC ARRAY) 118 and a microphone assembly (MIC ASSY) 120. Endpoints 104 may be wired or wireless communication devices equipped with the aforementioned components, such as, but not limited to laptop and tablet computers, smartphones, dedicated video conference endpoints, and the like. In a transmit direction, endpoints 104 capture audio/video from their local participants 106 with the camera 112, microphone array 118, and microphone assembly 120, encode the captured audio/video into data packets, and transmit the data packets (with metadata as described below) to other endpoints or to the conference server 102. In a receive direction, endpoints 104 decode audio/video from data packets (and the metadata) received from the conference server 102 or other endpoints, present the audio/video to their local participants 106 via the loudspeakers 116 and display 114, and perform loudspeaker panning or spatial audio playback based on the metadata, as will be described below. The same audio and metadata could for example be used for accurate rendering on a traditional stereo pair of speakers (i.e., assuming a centered listening position) or headphones (with the addition of binaural processing).

Figure 2:
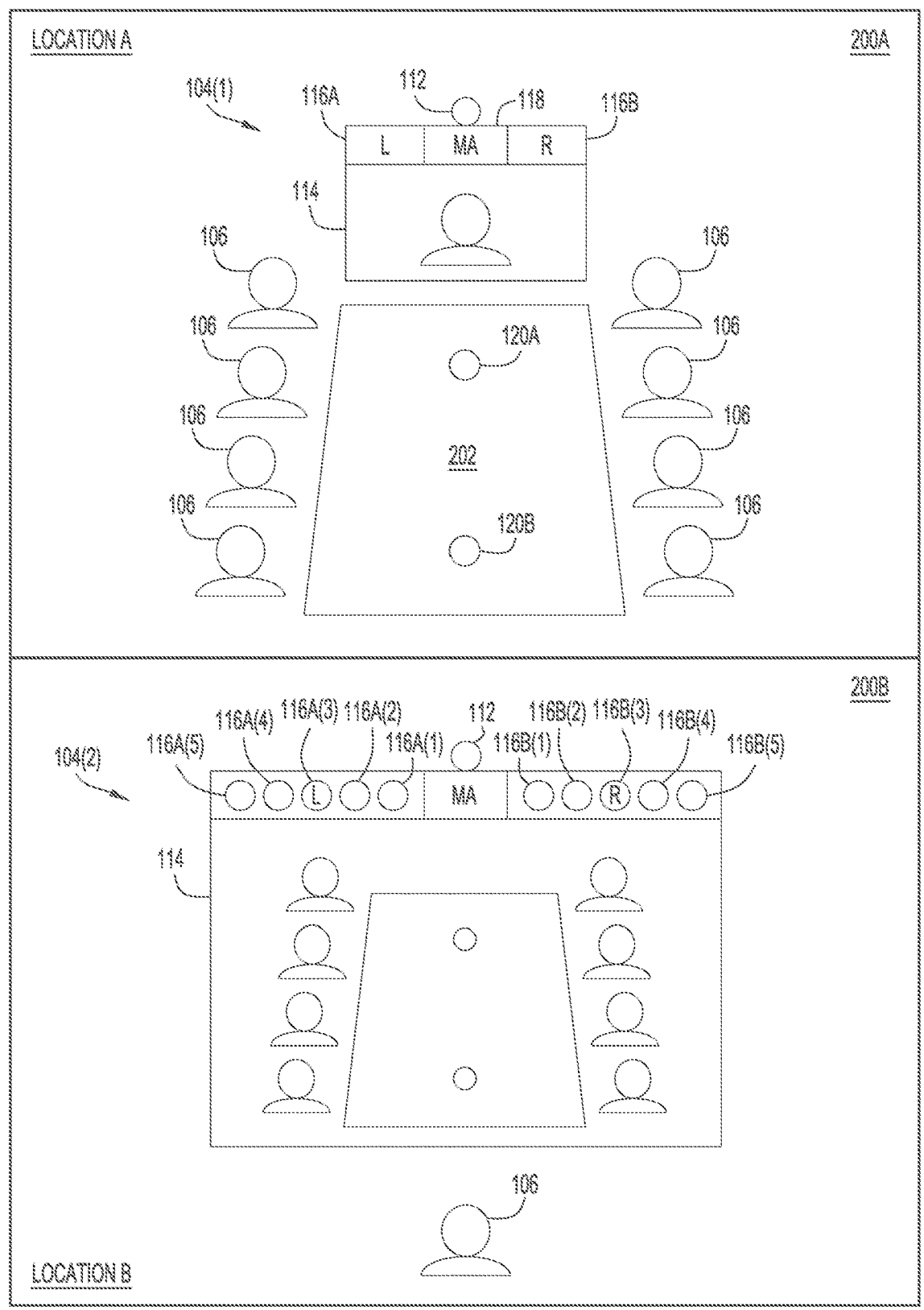
FIG. 2 is an illustration of video conference system including first and second video conference endpoints engaged in a conference or collaboration session and capable of generating and/or using positional audio metadata that supports spatial audio playback, according to an example embodiment.

Referring now to FIG. 2, there is an illustration of a video conference system including video conference endpoint 104(1) deployed at a location A (top-half of FIG. 2) and video conference endpoint 104(2) deployed at a location B (bottom-half of FIG. 2) engaged in a video conference session with each other. Endpoints 104(1) and 104(2) may be deployed in respective conference rooms 200A, 200B at their respective locations. Video conference endpoint 104(1) includes video camera 112 adjacent, and centered with respect to, a top side of display 114. Camera 112 includes pan (i.e., azimuth), tilt (i.e., elevation), and zoom (i.e., focal length or zoom-range) (PTZ) features that may be implemented mechanically and/or digitally. Endpoint 104(1) controls camera framing, i.e., PTZ settings of camera 112, to capture video of different views/scenes (i.e., to frame a view) of one or more of participants 106 seated around a table 202 opposite from or facing (i.e., in front of) the camera 112 (and display 114), including, but not limited to, a participant who is actively talking. The use of a single camera as depicted in FIG. 2 is only one example of many possible camera combinations, which may include multiple cameras, as would be appreciated by one of ordinary skill in the relevant arts having read the present description.

As depicted in the example of FIG. 2, microphone array 118 may also be disposed adjacent to, and centered along, the top side of display 114 so as to receive sound from participants 106. Camera 112 may be centered above microphone array 118; however, in another embodiment, microphone array 118 may be centered directly behind camera 112. In addition to microphone array 118, endpoint 104(1) is coupled with one or more microphone assemblies 120A-120B (collectively "microphone assemblies 120"). While two microphone assemblies 120A-120B are depicted in FIG. 2, the video conference endpoint 104(1) may include any number of microphone assemblies 120. As illustrated, the microphone assemblies 120A-120B may be disposed on conference table 202 at any position or location, or may be located on another surface disposed within the conference room 200A. The microphone assemblies 120A-120B may be disposed within the conference room 200A such that microphone assemblies 120A-120B receive audio generated within the conference room 200A (i.e., from participants 106 in conference room 200A, loudspeakers 116(1), 116(2), etc.), and provide the received audio to the endpoint 104(1). Loudspeakers 116 may include a left loudspeaker (L) 116A and a right loudspeaker (R) 116B adjacent the top side of the display 114. The loudspeakers 116A, 116B may be spaced-apart from each other so as to be positioned on opposite sides of microphone array 118. The left and right loudspeaker arrangement is one example of many possible positional arrangements of multiple loudspeakers deployed in an array of loudspeakers. Moreover, the use of two loudspeakers as depicted for the video conference endpoint 104(1) in FIG. 2 is only one example of many possible loudspeaker combinations, which may include one loudspeaker, or multiple loudspeakers, as would be appreciated by one of ordinary skill in the relevant arts having read the present description.

Endpoint 104(2) at location B is configured, and operates, similarly to endpoint 104(1), and therefore the description of endpoint 104(1) shall suffice for endpoint 104(2), except where their respective operations differ in the context of sound panning/spatial audio playback as described herein. In the video conference system depicted in FIG. 2, endpoint 104(1) transmits to endpoint 104(2) video captured of the scene of participants 106 seated around table 202 and sound captured by microphone array 118 and microphone assemblies 120A-120B from the participants 106. Endpoint 104(2) presents the video and sound received from endpoint 104(1), as shown in FIG. 1. Similarly, endpoint 104(2) transmits to endpoint 104(1) video captured of the single participant at location B and sound captured from that participant, if any. Endpoint 104(1) presents the video and sound received from endpoint 104(2), as shown in FIG. 2. As illustrated in FIG. 2B, endpoint 104(2) may include five left loudspeakers 116A(1)-116A(5) and five right loudspeakers 116B(1)-116B(5). The number of loudspeakers of endpoint 104(2) is merely an example embodiment of endpoint 104(2), and endpoint 104(2) may contain any number of loudspeakers.

According to embodiments described herein, endpoint 104(1) may convert a position of a sound source (e.g., an actively speaking participant 106), which may be determined from audio captured by microphone array 118 and microphone assemblies 120A-120B, to metadata that indicates the position of the sound source in/relative to an image/video frame of a view of the sound source (e.g., the actively speaking participant 106) captured by camera 112. The audio captured by microphone array 118 and microphone assemblies 120A-120B may be multi-channel, where each channel of the audio may correspond to a portion (e.g., as explained in further detail below, a specific tracking sector) of the output of the camera 112. Endpoint 104(1) transmits to endpoint 104(2) the audio and video streams, along with the metadata. Endpoint 104(2) uses the metadata to route or pan the sound to the appropriate left loudspeakers 116A(1)-116A(5) and/or right loudspeakers 116B(1)-116B(5) so that the loudspeaker(s) 116A(1)-116A(5), 116B(1)-116B(5) that outputs the audio matches the position of the sound source in the displayed video, either when displayed full frame or when used in a compound layout.

Figure 3A:
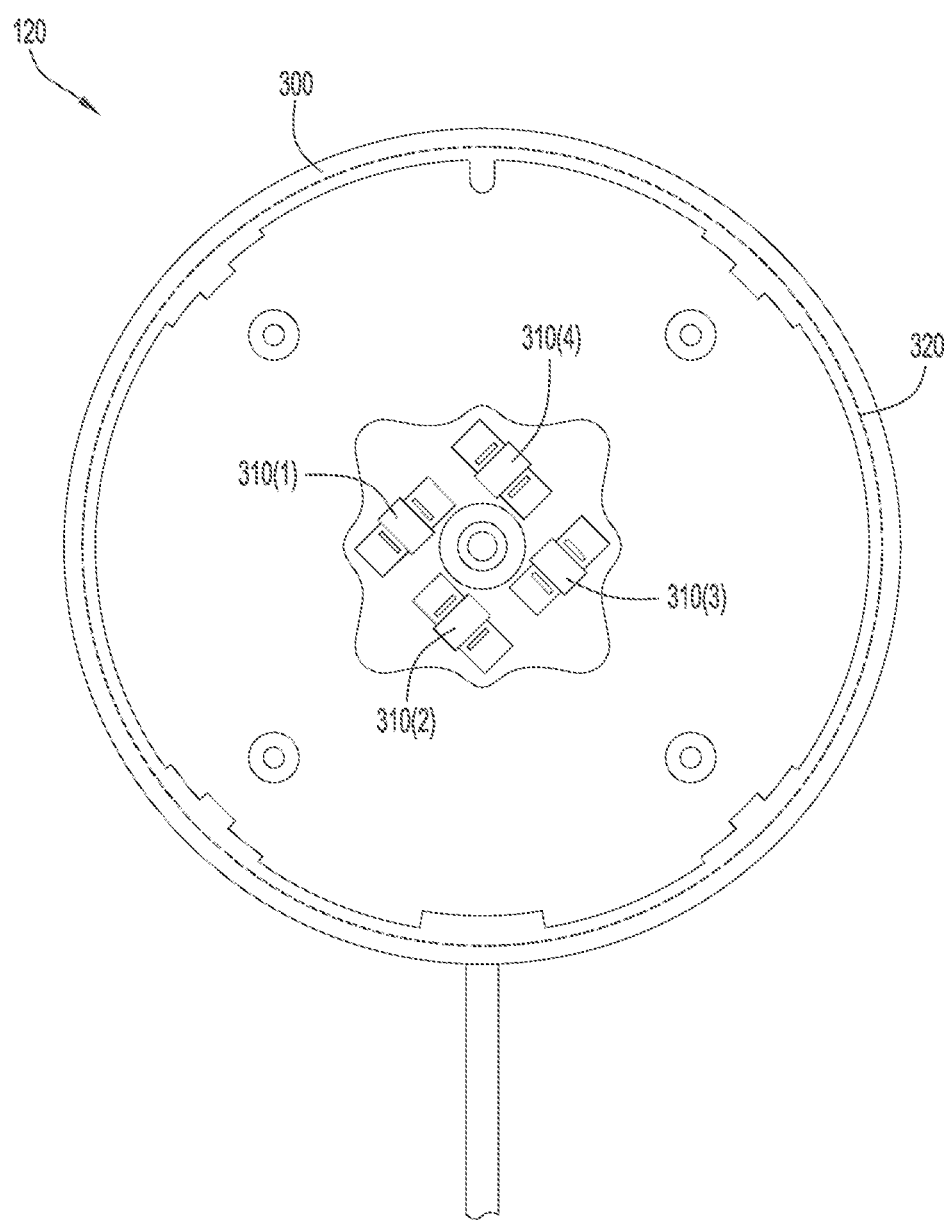
FIG. 3A is a top view showing microphone elements of a directional microphone assembly of a video conference endpoint configured to perform techniques presented herein, according to an example embodiment.

Turning to FIG. 3A, illustrated is a top view of an example embodiment of a microphone assembly 120. The microphone assembly 120 may include a base structure 300 and a plurality of directional microphones or microphone elements 310(1)-310(4) disposed on the base structure 300. While the embodiment of the microphone assembly 120 illustrated in FIG. 3A contains four directional microphones 310(1)-310(4), other embodiments of the microphone assembly 120 may include any number of directional microphones 310. Furthermore, the microphone assembly 120 may further include a cover 320 (shown in phantom) that is coupled to the base structure 300 and covers the directional microphones 310(1)-310(4). The cover 320 may be configured to protect the directional microphones 310(1)-310(4), while still enabling the directional microphones 310(1)-310(4) to receive and transduce audio.

Each of the directional microphones 310(1)-310(4) of the microphone assembly 120 may have a known polar pattern. In some embodiments, the directional microphones 310(1)-310(4) may each have the same polar pattern, while, in other embodiments, the directional microphones 310(1)-310(4) may have of a variety of polar patterns. The polar pattern of a microphone determines the sound sensitivity of the microphone at various angles (i.e., it defines how much of the sound or audio signal that will be picked up by the microphone at different directions or angles with respect to the microphone). Illustrated in FIG. 3B, and with continued reference to FIG. 3A, the directional microphones 310(1)-310(4) may have one of, but not limited to, the following polar patterns: cardioid 330, subcardioid 332, supercardioid 334, hypercardioid 336, figure eight 338, etc. As shown in FIG. 3B, a microphone having the cardioid polar pattern 330, for example, is most sensitive to sound or audio arriving from the 0° angle (i.e., straight ahead of the microphone), while being least sensitive to sound or audio arriving from the 180° angle (i.e., behind the microphone).

Figure 3C:
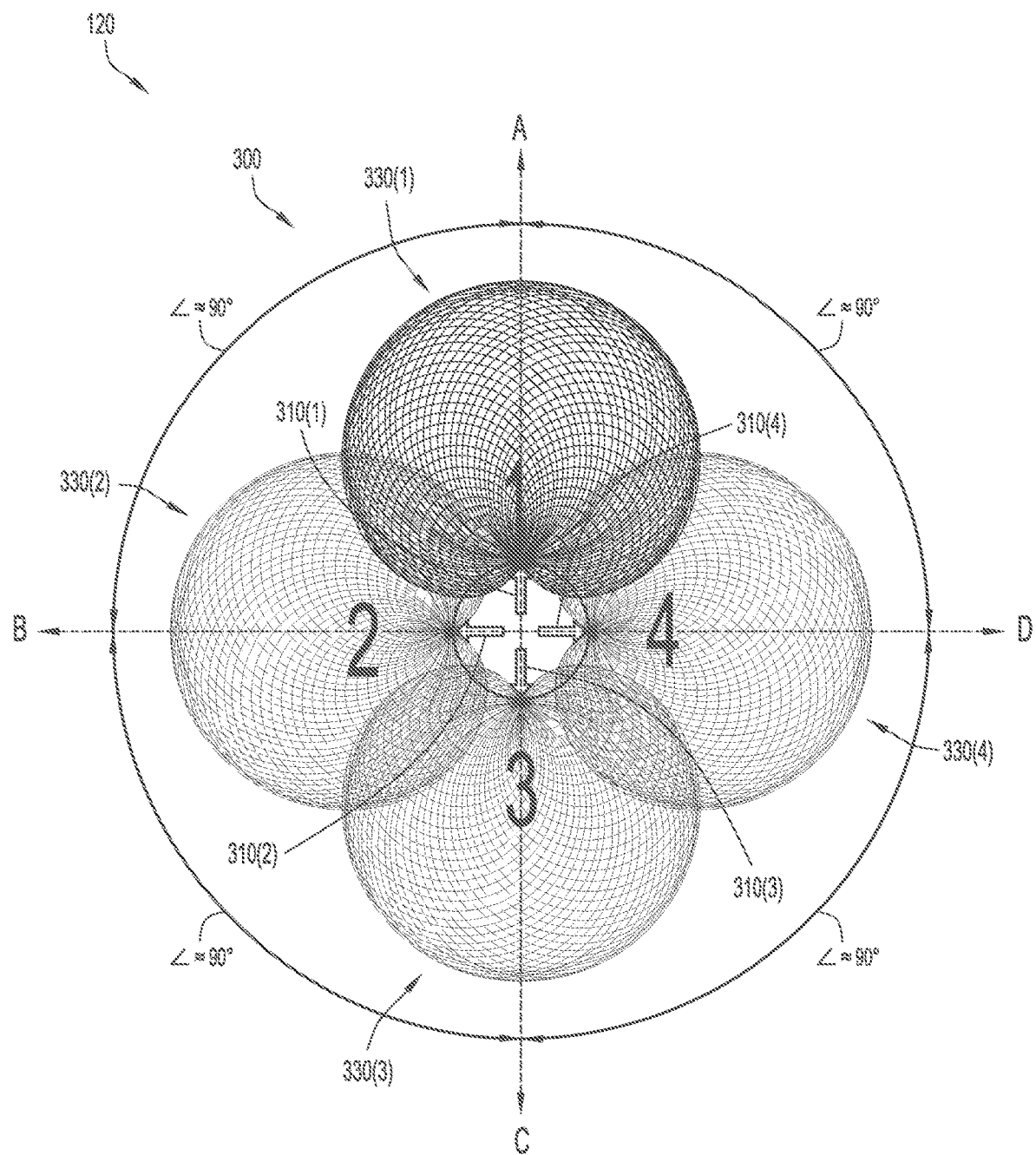
FIG. 3C is a schematic view illustrating cardioid polar patterns of the directional microphone assembly illustrated in FIG. 3A.

With reference to FIGS. 3A and 3C, and continued reference to FIG. 3B, the directional microphones 310(1)-310(4) may be cardioid directional microphones (i.e., directional microphones with a cardioid polar pattern 330) that are positioned within the microphone assembly 120 such that the directional microphones 310(1)-310(4) are co-located, or nearly co-located with one another, and such that the cardioid polar patterns 330(1)-330(4) of the directional microphones 310(1)-310(4), respectively, have a known orientation with respect to the cardioid polar patterns 330(1)-330(4) of the other directional microphones 310(1)-310(4), respectively. The terms co-located and near co-located mean that the directional microphones 310(1)-310(4) are located in such close proximity to one another that they are nearly in the same location as one another (i.e., have nearly the same spatial coordinates as one another with respect to the components of the video conference endpoint).

As further illustrated in the schematic illustration of the microphone assembly 120 of FIG. 3C, each of the directional microphones 310(1)-310(4) has a cardioid polar pattern 330(1)-330(4), respectively, that is perpendicular to its adjacent or neighboring directional microphone's polar cardioid polar pattern 330(1)-330(4), and that is directed in an opposite direction of the cardioid polar pattern 330(1)-330(4) of the opposing directional microphone 310(1)-310(4), respectively. The schematic illustration of the microphone assembly 120 of FIG. 3C is intended to show that the cardioid polar patterns 330(1)-330(4) of the directional microphones 310(1)-310(4), respectively, may generally be directed in certain directions, and may not account for the offset between the directional microphones 310(1)-310(4) of the example embodiment illustrated in FIG. 3A. Thus, as schematically shown in FIG. 3C, the cardioid polar pattern 330(1) of the first directional microphone 310(1) is directed along vector A. The second directional microphone 310(2) is adjacent to the first directional microphone 310(1), and has a cardioid polar pattern 330(2) that is directed along vector B, which is generally perpendicular to, or offset approximately 90° from, vector A. The fourth directional microphone 310(4) is also adjacent the first direction microphone 310(1), and has a cardioid polar pattern 330(4) that is directed along vector D, which is generally perpendicular to, or offset approximately 270° from, vector A. The third directional microphone 310(3) is opposite the first directional microphone 310(1), and has a cardioid polar pattern 330(3) that is directed along vector C, which is generally opposite of, or offset approximately 180° from, vector A.

In the example embodiment of the microphone assembly 120 described above, each of the directional microphones 310(1)-310(4) may serve as a single source of a transduced audio signal for audio that is received at the microphone assembly 120. According to other embodiments of the microphone assembly 120, the microphone assembly may be equipped with a plurality of microphones that may have their transduced audio signals mixed (via coherent array processing) to form directive virtual microphones (i.e., the microphones may have directional polar patterns that can differ in direction and shape from the physical microphone elements). In even further embodiments of the microphone assembly 120, a microphone assembly may be an array of microphones that are not co-located, and can have omni-directional polar patterns that may be subsequently combined into virtual directional co-located patterns. Any embodiment of the microphone assembly 120 may be utilized to separate the audio into multiple channels for the tracking sectors.

Figure 4A:
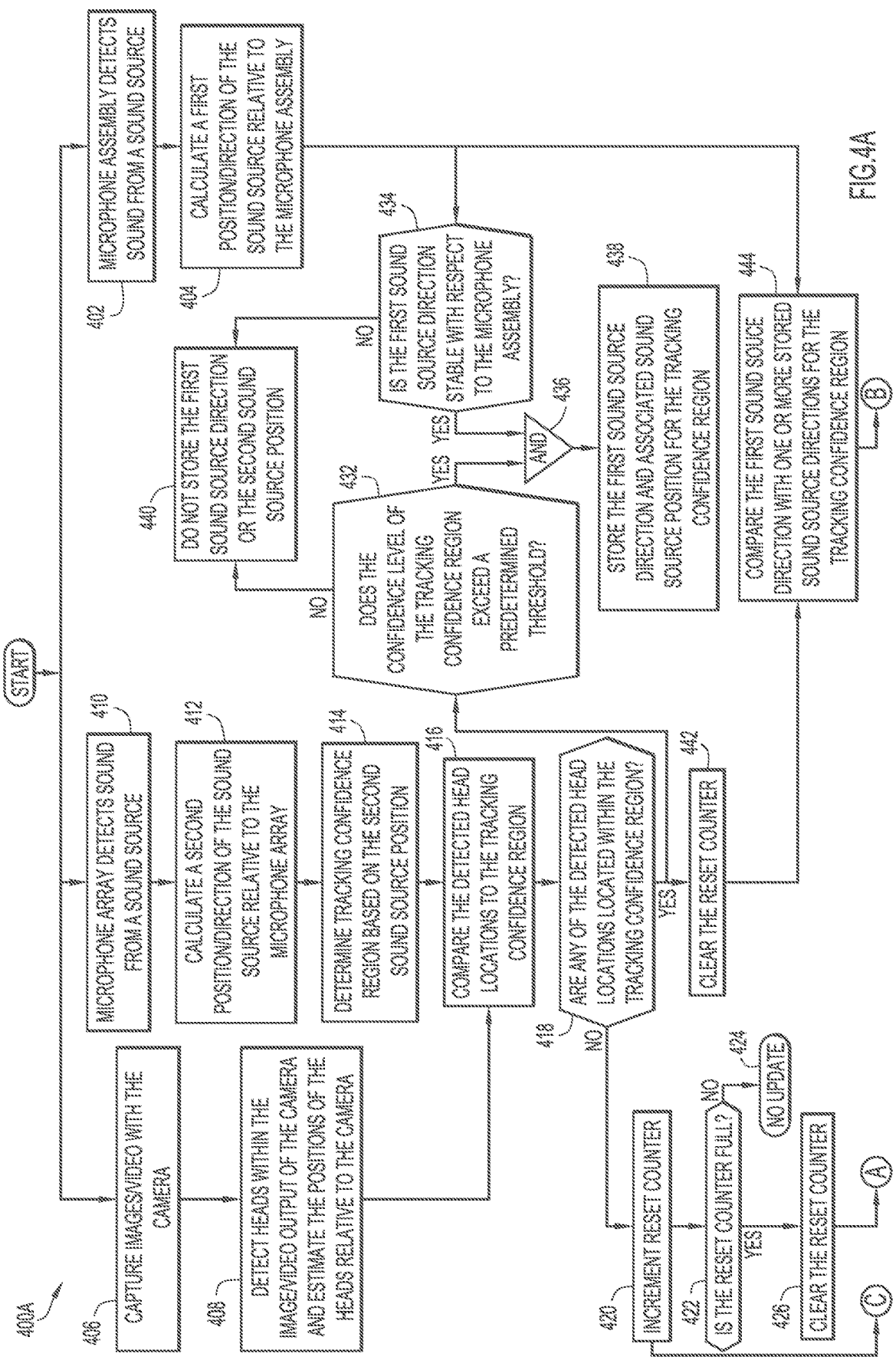
FIGS. 4A and 4B together depict a flowchart of a method for generating the positional audio metadata, according to an example embodiment.
Figure 4B:
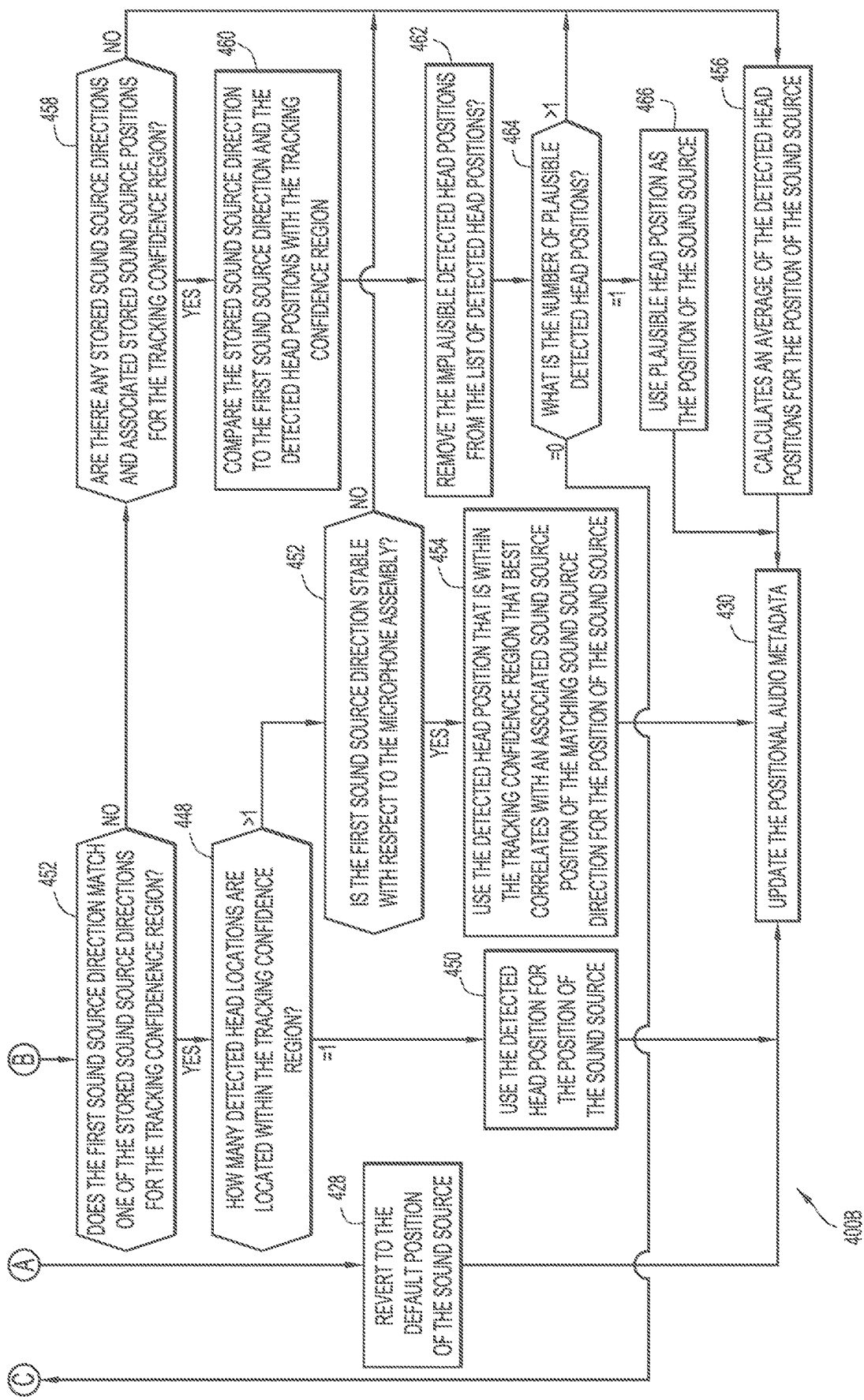

Turning to FIGS. 4A and 4B, illustrated is a flowchart of an example method 400 (the first part 400A of method 400 being shown in FIG. 4A, while the second part 400B of the method 400 being shown in FIG. 4B) for the generation of positional audio metadata or sound location metadata of a sound source within a tracking sector of a video output of a camera. Method 400 is described with reference to the conference system of FIG. 2 and the microphone assembly 120 of FIGS. 3A-3C, by way of example only. Method 400 may be performed by/at each of endpoints 104 for each tracking sector of a video output of the camera of the endpoint 104.

Initially, as illustrated in FIG. 4A, the flow may proceed in parallel from a start of method 400, where first operations 402, 404, second operations 406, 408, and third operations 410, 412, 414 may be executed in parallel with one another, or simultaneously. Although not explicitly shown in method 400, endpoints 104(1) and 104(2) transmit to each other their respectively captured image/video frames and captured sound in video streams and sound streams while the operations that are explicitly shown in FIGS. 4A and 4B are performed.

As illustrated in FIG. 4A, at 402, video conference endpoint 104(1) may capture audio/sound from a sound source, such as, but not limited to, an actively speaking participant 106 via one or both of the microphone assemblies 120A, 120B. At 404, the endpoint 104(1) may determine or calculate a first position/direction of the sound source (referred to as the first sound source position, first sound source direction, or first audio tracking direction estimate) based on the sound or audio captured by at least one of the microphone assemblies 120A, 120B. In other words, when calculating the first sound source direction, the video conference endpoint 104(1) may calculate a direction of the sound source with respect to the microphone assembly 120A, 120B that received/captured the sound (e.g., from the actively speaking participant). The direction may be represented as azimuth angles in which the audio/sound was received by the microphone assembly 120A, 120B. Any known method for determining a sound source direction with respect to a microphone array or microphone assembly may be used.

Continuing with FIG. 4A, at 406, the video conference endpoint 104(1) may, simultaneous to performing steps 402 and 404, capture images and/or video with the camera 112 of the video conference endpoint 104(1). The initial camera framing, when capturing images and/or video, may correspond to a wide-angle or zoomed-out view (also referred to as "overview") that encompasses all of participants 106 seated around table 202 at location A, for example. Over time, an example overview may represent a view centered on the group of participants 106 (identified by their detected heads) seated around table 202 and in which the degree of zoom establishes an outer boundary around the group. The outer boundary may be fitted relatively tightly to the group but allows room to show, e.g., the face and an upper body of each of the participants with extra margin to accommodate participant movement. Endpoint 104(1) may adjust the outer boundary dynamically to account for movement, and when new heads are detected or when previously detected heads become undetectable. At 408, endpoint 104(1) detects heads and positions thereof in the captured images/video frames. To do this, endpoint 104(1) may process the captured images/video frames with a head detection algorithm that detects the heads and outputs a detected head position relative to the camera 112 (e.g., relative to the image/video frames output by the camera 112).

At 410, the video conference endpoint 104(1) may, simultaneous to performing steps 402, 404, 406, and 408, capture sound from a sound source, such as, but not limited to, an actively speaking participant 106 with the microphone array 118. At 412, the endpoint 104(1) may determine or calculate a second position/direction of the sound source (referred to as the second sound source position, second sound source direction, or second audio tracking direction estimate) based on the sound or audio captured by the microphone array 118. In other words, endpoint 104(1) determines a second sound source position (i.e., spatial coordinates and/or direction) of a sound source in a coordinate system with respect to the camera 112 of the endpoint 104(1). In some embodiments, when calculating the second sound source position, the video conference endpoint 104(1) may first calculate a sound direction of the sound source with respect to the microphone array 118, as well as spatial coordinates of the sound source with respect to the microphone array 118. The sound direction (referred also as to a "sound source direction") may be represented as azimuth and elevation angles in which the audio/sound was received by the microphone array 118. With the components of the video conference endpoint 104(1) having known spatial relationships with respect to one another, and with the sound direction and spatial coordinates of the sound source with respect to the microphone array 118 known, the video conference endpoint 104(1) may be able to determine, using known mathematical computations, the second sound source position with respect to any of the components (e.g., the camera 112) of the video conference endpoint 104(1). More specifically, the video conference endpoint 104(1) may convert the sound direction of the sound source with respect to the microphone array 118 to the second sound source position relative to the camera framing (i.e., relative to the image/video frames output by the camera 112). Thus, the second sound source position represents a sound source position (determined from the captured sound by the microphone array 118) as projected onto the image/video frames.

With continued reference to FIG. 4A, at 414, the video conference endpoint 104(1) may determine a tracking confidence region 414 based on the second sound source position or a plurality of second sound source positions. The tracking confidence region may be a region, portion, and/or subset of the tracking sector of the video output of the camera 112 that corresponds to the general location of the second sound source position. In some embodiments, depending on the environment in which the video conference endpoint 104(1) is setup, the image/video output of the camera 112 may be divided into two symmetrical tracking sectors, which each tracking sector corresponds to one half of the conference room 200A in which the video conference endpoint 104(1) is disposed, or one half of the conference table 202 disposed in front of the video conference endpoint 104(1). The video conference endpoint 104(1) may determine separate tracking confidence regions for each respective tracking section of the video output of the camera. The size of the tracking confidence region may be determined from the calculated tracking confidence of the second sound source position or plurality of second sound source positions. In other words, the higher the tracking confidence (or, conversely, the lower the variance) for the second sound source position/direction, the smaller the tracking confidence region. The lower the tracking confidence (or, conversely, the higher the variance) for the second sound source position/direction, the larger the tracking confidence region. At 416, the video conference endpoint 104(1) may then compare each of the detected head positions from step 408 with the tracking confidence region to determine if any of the detected head positions are located within the tracking confidence region.

As shown in FIG. 4A, at 418, the video conference endpoint 104(1) determines if each one of the detected head positions fall or are located within the tracking confidence region. If, at 418, there are no detected head positions located within the tracking confidence region, then, at 420, the video conference endpoint increments a reset counter. At 422, the video conference endpoint determines whether or not the reset counter 422 is full (e.g., have the number of tracking update attempts reached a predetermined number). If, at 422, the reset counter is not yet full, then, at 424, no update is performed by the video conference endpoint 104(1), and the video conference endpoint 104(1) continues to attempt to update the tracking of the audio source. However, if, at 422, the reset counter is full (i.e., the number of tracking update attempts has reached a predetermined number), then, at 426, the video conference endpoint 104(1) clears the reset counter. As shown in FIG. 4B, at 428, the video conference endpoint 104(1) then reverts to a default position for the sound source, and, at 430, updates the positional audio metadata to represent the default position for the sound source. In other words, the video conference endpoint 104(1) does not provide any specific position of the sound source for the positional audio metadata for the captured sound source that may be utilized by video conference endpoint 104(2) that will enable video conference endpoint 104(2) to output the sound source from the loudspeakers 116A(1)-116A(5), 116B(1)-116B(5) in a manner that matches the video output received from the video conference endpoint 104(1).

Returning to FIG. 4A, if, at 418, the video conference endpoint 104(1) determines that one or more of the detected head positions do fall, or are located, within the tracking confidence region, then, at 432, the video conference endpoint 104(1) determines if the tracking confidence of the tracking confidence region, as calculated in step 414, exceeds a predetermined threshold (i.e., the variance in estimated sound source directions is low, and the size of the estimated source location region is relatively small). Simultaneously, at 434, the video conference endpoint 104(1) also determines if the first sound source direction has remained stable or constant with respect to the microphone assembly 120A, 120B that captured the sound source. If the video conference endpoint 104(1) determines both that the tracking confidence exceeds the predetermined threshold level at 432 and that the first sound source direction has remained stable enough at 434, then the video conference endpoint 104(1) may combine or associate, at 436, the first sound source direction with the tracking confidence region, the second sound source position, and/or the detected head positions within the tracking confidence region (the second sound source position and/or the detected head positions collectively referred to as associated stored sound source position(s)). At 438, the video conference endpoint 104(1) may then store the first sound source direction for the specific tracking confidence region and the associated sound source position(s) of the first sound source direction. However, if the video conference endpoint 104(1) determines either, at 432, that the tracking confidence of the tracking confidence region does not exceed the predetermined threshold, or, at 434, that the first sound source direction is not stable enough with respect to the microphone assembly 120A, 120B, then, at 440, the video conference endpoint 104(1) does not store the first sound source direction and the associated sound source positions for the specific tracking confidence region.

Continuing with FIG. 4A, if, at 418, the video conference endpoint 104(1) determines that one or more of the detected head positions do fall, or are located, within the tracking confidence region, then, at 442, and simultaneous to performing steps 432, 434, 436, 438, and 440, the video conference endpoint 104(1) clears the reset counter 442. At 444, the video conference endpoint 104(1) compares the first sound source direction to one or more of the stored sound source directions for the tracking confidence region. Turning to FIG. 4B, the video conference endpoint 104(1) then determines, at 446, whether the first sound source direction matches one of the stored sound source directions for the tracking confidence region. If, at 446, the video conference endpoint 104(1) determines that the first sound source direction does match one of the stored sound source directions for the tracking confidence region, then, at 448, the video conference endpoint 104(1) determines how many detected head locations are located within the tracking confidence region. If, at 448, the video conference endpoint 104(1) determines there is only one detected head position located within the tracking confidence region, then, at 450, the video conference endpoint utilizes the detected head position for the position of the sound source. The video conference endpoint 104(1), at 430, then updates the positional audio metadata to utilize the detected head position for the position of the sound source so that the video conference endpoint 104(2) may output the audio received from the video conference endpoint 104(1) from the loudspeaker(s) 116A(1)-116A(5), 116B(1)-116B(5) that best matches the location of the sound source in the video output received from the video conference endpoint 104(1).

Continuing with FIG. 4B, if, at 448, the video conference endpoint 104(1) determines that more than one detected head position is located within the tracking confidence region, then, at 452, the video conference endpoint 104(1) determines if the value of the first sound source direction has remained stable or constant with respect to the microphone assembly 120A, 120B that captured the sound source. If the video conference endpoint 104(1) determines that the first sound source direction has remained stable enough at 452, then the video conference endpoint 104(1), at 454, utilizes the detected head position that is within the tracking confidence region that best corresponds/aligns/correlates with the associated stored sound source position of the matching stored sound source direction of the first sound source direction. The video conference endpoint 104(1), then, at 430, updates the positional audio metadata to utilize the detected head position that correlates with the stored sound source direction that matches the first sound source direction so that the video conference endpoint 104(2) may output the audio received from the video conference endpoint 104(1) from the loudspeaker(s) 116A(1)-116A(5), 116B(1)-116B(5) that best matches the location of the sound source in the video output received from the video conference endpoint 104(1). However, if, at 452, the video conference endpoint 104(1) determines that the first sound source position has not remained stable or constant with respect to the microphone assembly 120A, 120B, then, at 456, the video conference endpoint 104(1) calculates an average position of the detected head positions within the current tracking confidence region. The video conference endpoint 104(1), at 430, then updates the positional audio metadata to utilize the average position of the detected head positions for the position of the sound source so that the video conference endpoint 104(2) may output the audio received from the video conference endpoint 104(1) from the loudspeaker(s) 116A(1)-116A(5), 116B(1)-116B(5) that best matches the location of the sound source in the video output received from the video conference endpoint 104(1).

Continuing with FIG. 4B, and returning to step 446, if the video conference endpoint 104(1) determines that the first sound source direction does not match any of the stored sound source directions, then, at 458, the video conference endpoint 104(1) determines if there are any stored sound source directions and associated stored sound source positions (collectively referred to as stored sound source position and direction combinations) for the tracking confidence region. If, at 458, the video conference endpoint 104(1) determines that at least one of the stored sound source directions and associated stored sound source positions is within the tracking confidence region, then, at 460, the video conference endpoint 104(1) compares the stored sound source direction of the tracking confidence region to the first sound source direction, and compares the detected head positions to the tracking confidence region to determine which of the detected head positions are plausible detected head locations for the sound source. In other words, the video conference endpoint 104(1), at 460, determines which of the detected head positions may possibly represent the location of the sound source based on the tracking confidence region, the first sound source direction, the stored sound source direction, and the associated stored sound source position (the stored sound source position and direction combination) for the tracking confidence region. At 462, the video conference endpoint 104(1) then removes the implausible detected head positions from the list of detected head positions (i.e., the video conference endpoint 104(1) narrows the list of the detected head positions to just those detected head positions that are plausible detected head positions).

At 464, the video conference endpoint 104(1) then determines the number of plausible head positions. If, at 464, the video conference endpoint 104(1) determines that the number of plausible head positions is equal to 1, then, at 466, the video conference endpoint uses the plausible head position as the sound source position. At 430, the video conference endpoint 104(1) then updates the positional audio metadata to utilize the plausible detected head position for the position of the sound source so that the video conference endpoint 104(2) may output the audio received from the video conference endpoint 104(1) from the loudspeaker(s) 116A(1)-116A(5), 116B(1)-116B(5) that best matches the location of the sound source in the video output received from the video conference endpoint 104(1).

Returning to step 464, if the video conference endpoint 104(1) determines the number of plausible detected head positions is greater than 1, then, at 456, the video conference endpoint calculates an average position of the plausible detected head positions. The video conference endpoint 104(1), at 430, then updates the positional audio metadata to utilize the average position of the plausible detected head positions for the position of the sound source so that the video conference endpoint 104(2) may output the audio received from the video conference endpoint 104(1) from the loudspeaker(s) 116A(1)-116A(5), 116B(1)-116B(5) that best matches the location of the sound source in the video output received from the video conference endpoint 104(1). However, if at 464, the video conference endpoint determines that the number of plausible detected head positions is equal to zero, the video conference endpoint 104(1), as illustrated in FIG. 4A, increments the reset counter at step 420.

Returning to FIG. 4B, and returning to step 458, if the video conference endpoint 104(1) determines that none of the stored sound source directions and associated stored sound source positions (stored sound source position and direction combination) are associated with the tracking confidence region, then, at 456, the video conference endpoint calculates an average position of the detected head positions for the tracking confidence region. The video conference endpoint 104(1), at 430, then updates the positional audio metadata to utilize the average position of the detected head positions for the tracking confidence region for the position of the sound source so that the video conference endpoint 104(2) may output the audio received from the video conference endpoint 104(1) from the loudspeaker(s) 116A(1)-116A(5), 116B(1)-116B(5) that best matches the location of the sound source in the video output received from the video conference endpoint 104(1).

Once the video conference endpoint 104(1) has updated the positional audio metadata at 430 for each tracking sector of a video output of the camera 112, based on the method 400, the video conference endpoint 104(1) may transmit to video conference endpoint 104(2) contemporaneously captured image/video frames, captured multi-channel audio, and the positional audio metadata for each tracking sector. The positional audio metadata may be embedded in the transmitted sound stream, where the positional audio metadata may be a set of coordinates of the location of the sound source relative to the captured image/video frames and the respective tracking sector. In other words, video conference endpoint 104(1) may transmit multi-channel sound associated with the image/video frames, where the positional audio metadata embedded in the transmitted multi-channel sound includes the calculated sound source position as coordinates to enable the video conference endpoint 104(2) to spatially output the transmitted multi-channel sound such that the location of the sound matches what is displayed for the transmitted image/video stream. In some embodiments, the video conference endpoint may not embed the positional audio metadata in the transmitted multi-channel sound, and, instead, may transmit the positional audio metadata separately. In other embodiments, the second or receiving video conference endpoint 104(2) may not support the spatial audio playback. In these instances, the second video conference endpoint 104(2) may simply ignore the metadata and just use the audio signal directly as a basic stereo transmission, or even downmixing the stereo transmission to mono when necessary.

Figure 5A:
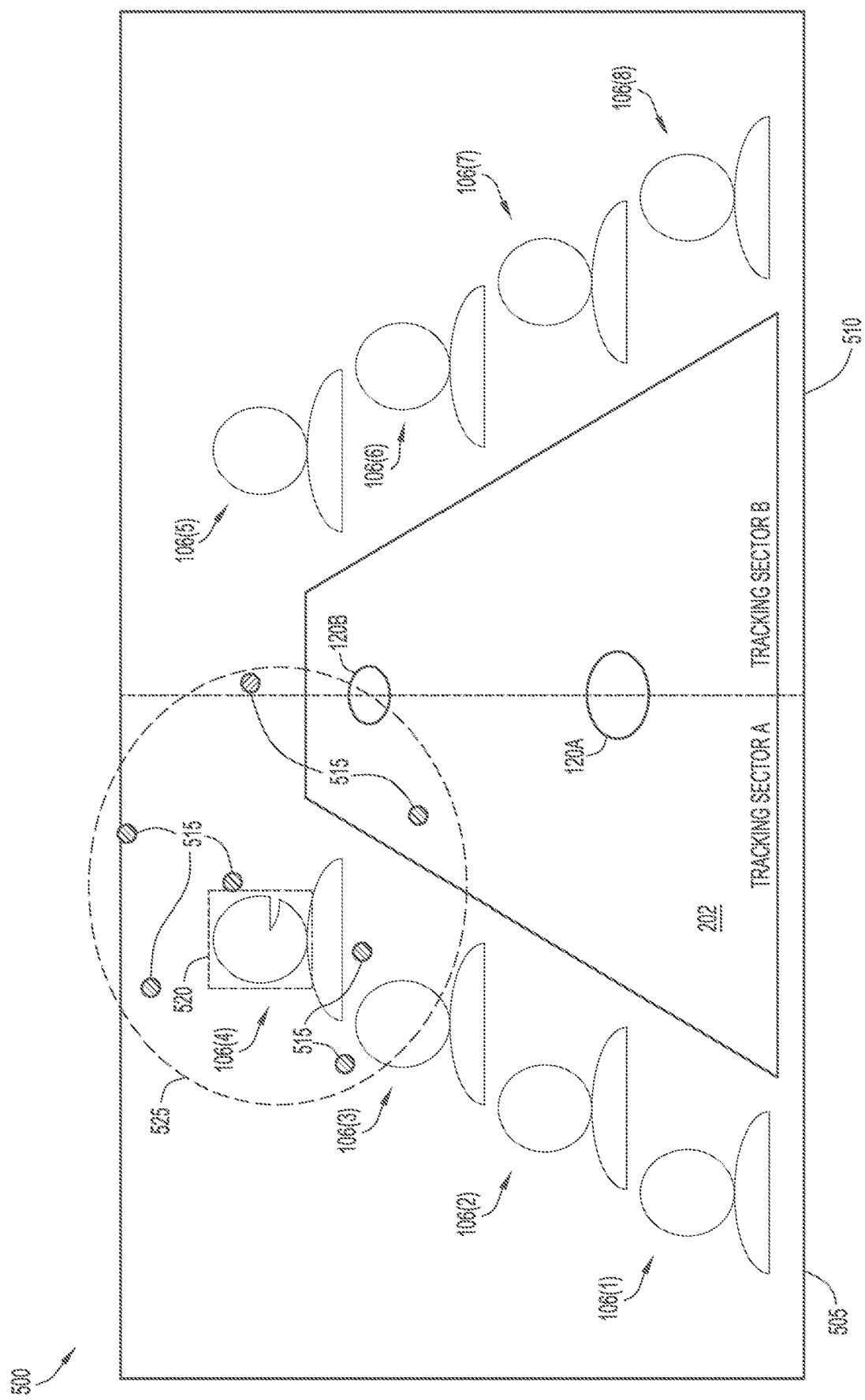
FIGS. 5A-5C are example illustrations of the tracking confidence regions of various sectors of the video output(s) of the camera(s) of the first video conference endpoint, according to example embodiments.
Figure 5B:
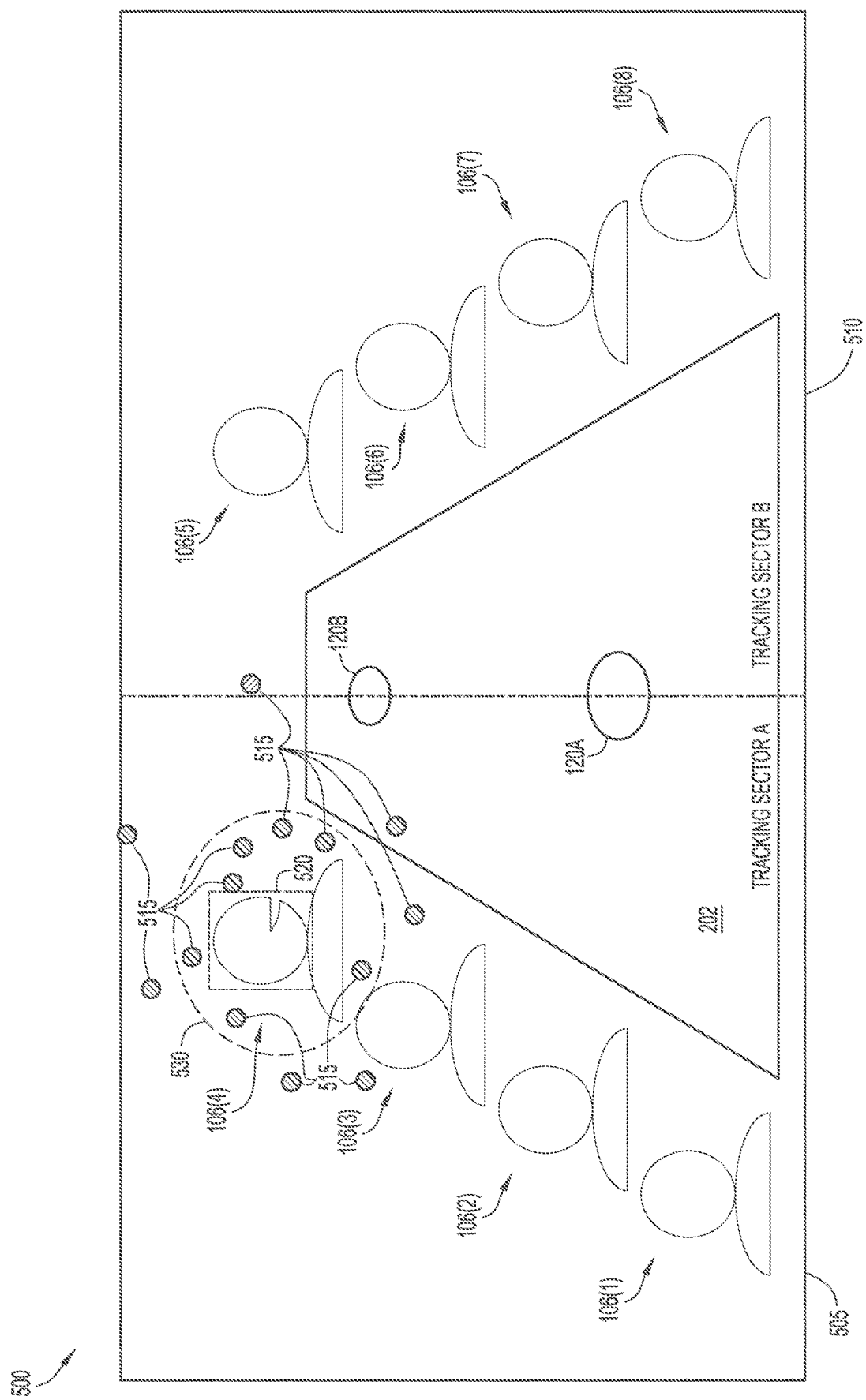
Figure 5C:
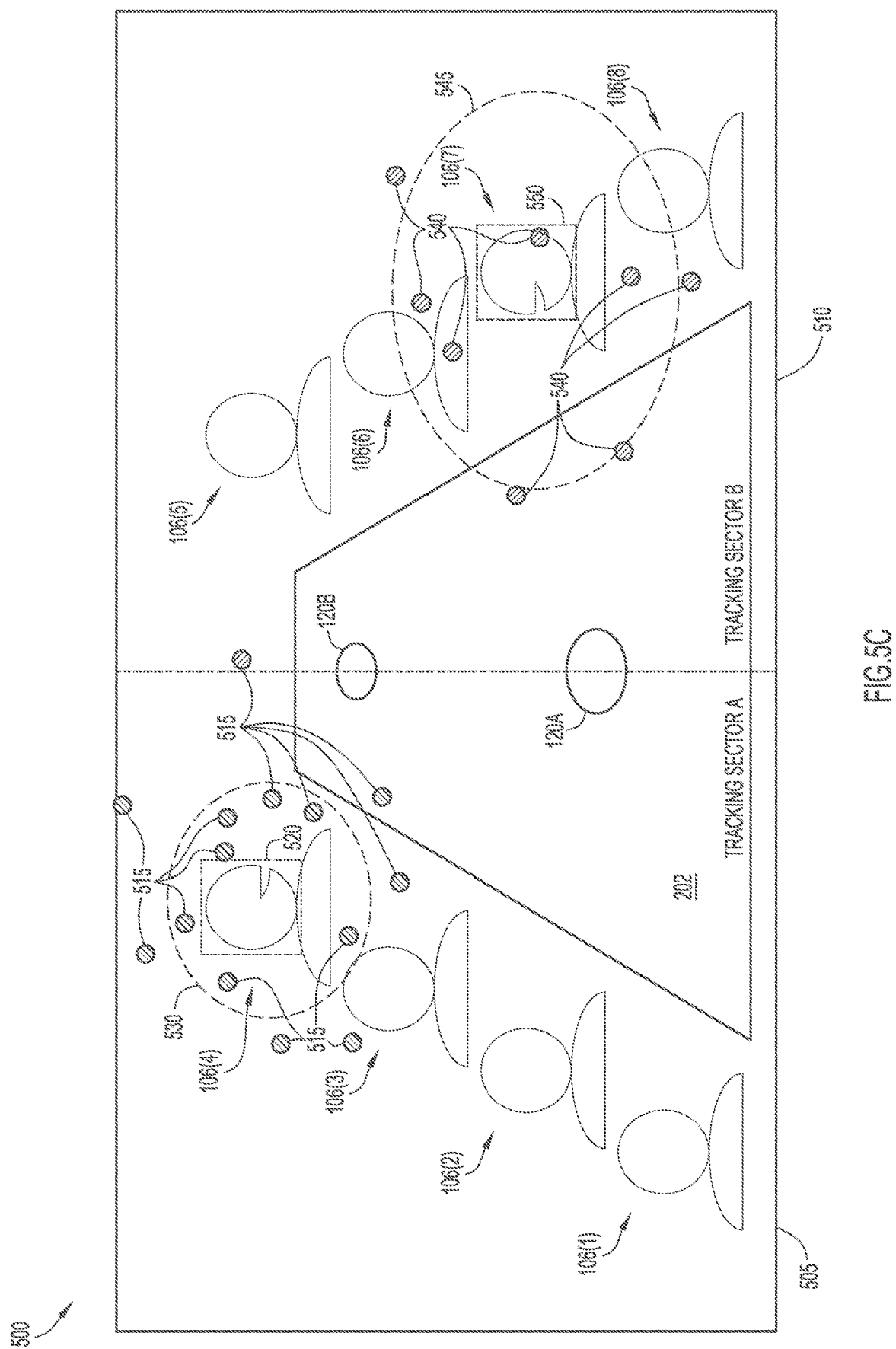

Turning to FIGS. 5A-5C, and with continued reference to FIGS. 2, 3A, 3B, 3C, 4A, and 4B, illustrated are example embodiments of video outputs of video conference endpoint 104(1) and the associated tracking confidence regions that are formulated/generated using method 400. As illustrated in FIG. 5A, the video output 500 of camera 112 of the video conference endpoint 104(1) may contain eight participants 106(1)-106(8) seated around the conference table 202, where participant 106(4) is an actively speaking participant. The video output 500 of the camera 112 of the video conference endpoint 104(1) may be separated or divided into multiple tracking sectors 505, 510. While only two tracking sectors 505, 510 are present in FIG. 5A, the video output of the video conference endpoint 104(1) may be divided or separated into any number of tracking sectors.

In accordance with the method 400 of FIG. 4, and as shown in FIG. 5A, the video conference endpoint 104(1)

may detect multiple audio tracking directional estimates or active sound source positions 515. In the illustrated example of FIG. 5A, seven sound source positions 515 have been detected, where the majority (e.g., six) of the sound source positions 515 are located in the first tracking sector 505, and one sound source position 515 is located in the second tracking sector 510. Moreover, the detected sound source positions 515 are located in proximity to the third and fourth participants 106(3), 106(4), and in proximity to the detected head location 520 of the fourth participant 106(4). Using the sound source positions 515, the video conference endpoint 104(1) may determine a tracking confidence region 525. The tracking confidence region 525 illustrated in FIG. 5A may have a low or lower confidence due to a combination of the number of sound source positions 515 and the distance between the active speaking participant 106(4) and the video conference endpoint 104(1) (i.e., the distance the active speaking participant 106(4) is from the video camera 112 and microphone array 118 of the video conference endpoint 104(1)).

As the active speaking participant 106(4) continues to speak (i.e., the active speaking participant 106(4) is a stable talker), the video conference endpoint 104(1) may update the tracking confidence region 525 to a tracking confidence region with a higher confidence. As illustrated in the video output 500 of camera 112 of the video conference endpoint 104(1) illustrated in FIG. 5B, the active speaking participant 106(4) has continued to speak, which resulted in an increase number of sound source positions 515. In the example illustrated in FIG. 5B, because the active speaking participant 106(4) has continued to speak, or been a stable speaker, the number of sound source positions 515 has increased from seven detected sound source positions 515 (as illustrated in FIG. 5A) to fourteen detected sound source positions 515 (as illustrated in FIG. 5B). FIG. 5B illustrates that the fourteen detected sound source positions 515 are located primarily in the first tracking sector 505 (with only one detected sound source positions 515 located in the second tracking sector 510), and are located primarily around the fourth participant 106(4), who is the actively speaking participant. With the increase in the number of detected sound source positions 515, the video conference endpoint 104(1) may update the tracking confidence region 525 illustrated in FIG. 5A, which is a tracking confidence region with a low confidence, to the tracking confidence region 530 illustrated in FIG. 5B, which is a tracking confidence region with a high confidence. In comparing the tracking confidence region 525 illustrated in FIG. 5A, which has a low confidence, with the tracking confidence region 530 illustrated in FIG. 5B, which has a high confidence region, it can be seen that the tracking confidence region 530 is smaller in size than the tracking confidence region 525. Thus, as illustrated in FIGS. 5A and 5B, the tracking confidence region 530 only includes the head of the fourth participant 106(4), while the tracking confidence region 525 includes the heads of the third and fourth participants 106(3), 106(4).

Turning to FIG. 5C, and with continued reference to FIGS. 5A and 5B, illustrated is the video output 500 of camera 112 of the video conference endpoint 104(1), which may be divided into two tracking sectors 505, 510, with the fourth participant 106(4) still actively speaking, but with the seventh participant 106(7) also actively speaking (e.g., the fourth and seventh participants 106(4), 106(7) may be having a cross-table conversation). As illustrated in FIG. 5C, the video conference endpoint 104(1) has detected fourteen audio tracking directional estimates or sound source positions 515 that are located primarily in proximity to the fourth participant 106(4), and primarily in the first tracking sector 505, while also separately and sequentially detecting eight audio tracking directional estimates or active sound source positions 540 located primarily in proximity to the seventh participant 106(7), and located in the second tracking sector 510. In other words, the video conference endpoint 104(1) may sequentially detect the audio tracking directional estimates or sound source positions 515 and the audio tracking directional estimates or active sound source positions 540 over a period of time. As previously explained with regard to FIGS. 5A and 5B, due to the fourth participant 106(4) being a stable talker, and due to the fourteen sound source positions 515, the video conference endpoint 104(1) may determine a tracking confidence region 530 in the first tracking sector 505 that has a high confidence, and includes the fourth participant 106(4). As illustrated in FIG. 5C, the video conference endpoint 104(1) may separately and simultaneously (e.g., using clustering techniques) determine a tracking confidence region 545 for the second tracking sector 510 based on the eight detected sound source positions 540 that resulted from the speaking done by the seventh participant 106(7). The tracking confidence region 545 illustrated in FIG. 5C may have a medium confidence as compared the high tracking confidence region 530 (illustrated in FIGS. 5B and 5C) and the low tracking confidence region 525 (illustrated in FIG. 5A). The tracking confidence region 545 illustrated in FIG. 5C may be a medium confidence due to a combination of the number of sound source positions 540 and the distance between the active speaking participant 106(7) and the video conference endpoint 104(1) (i.e., the distance the active speaking participant 106(7) is from the video camera 112 and microphone array 118 of the video conference endpoint 104(1)). In other words, because the seventh participant 106(7) is more closely located to the video conference endpoint 104(1) than the fourth participant 106(4) (e.g., which may, in some embodiments, be determined based on the detected head size of the seventh participant 106(7) compared to the detected head size of the fourth participant 106(4)), the tracking confidence region formed from sound source positions resulting from the seventh participant 106(7) may have a higher confidence than the tracking confidence region formed from sound source positions resulting from the fourth participant 106(4) when the number of sound source positions from each participant 106(4), 106(7) is approximately the same.

Figure 6:
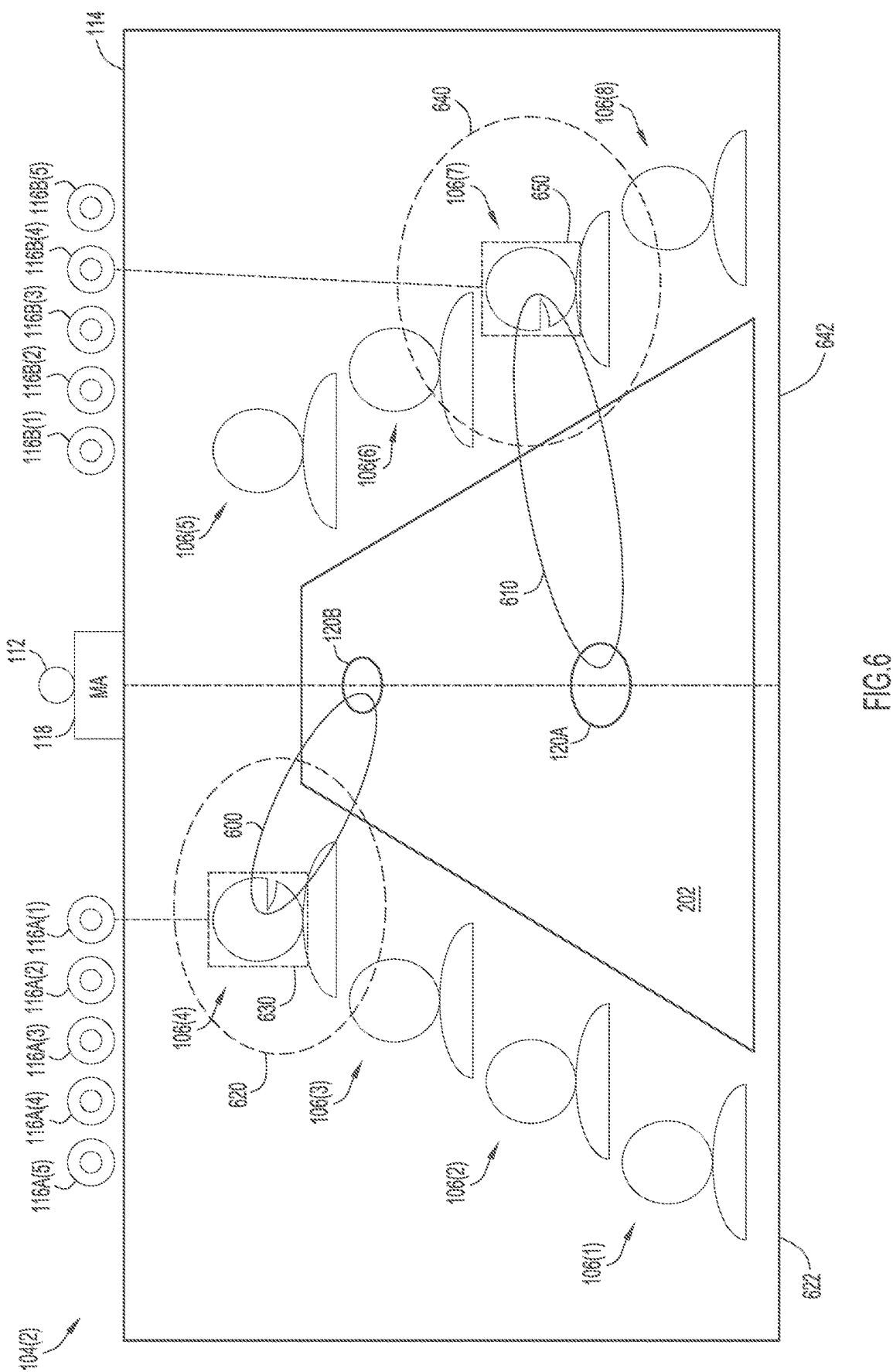
FIG. 6 is an example illustration of the view of the second video conference endpoint of FIG. 2 that is spatially outputting audio relative to the video output based on the positional audio metadata generated by the first video conference endpoint, according to an example embodiment.

Turning to FIG. 6, and with continued reference to FIGS. 2, 3A, 3B, 3C, 4A, 4B, and 5A-5C, illustrated is a view of the video conference endpoint 104(2) at location B that utilizes the positional audio metadata generated and transmitted by the video conference endpoint 104(1) to spatially playback the audio captured by the video conference endpoint 104(1) in a manner that matches the images/video captured and transmitted by the video conference endpoint 104(1). As previously explained, video conference endpoint 104(2) may include five left loudspeakers 116A(1)-116A(5) and five right loudspeakers 116B(1)-116B(5). In other embodiments, the video conference endpoint 104(2) may include any number of loudspeakers, and the number of loudspeakers illustrated in FIG. 6 is merely an example embodiment of video conference endpoint 104(2). Video conference endpoint 104(2) may receive the image/video frames, the multi-channel sound/audio, and the positional audio metadata transmitted by video conference endpoint 104(1). As shown in FIG. 6, video conference endpoint 104(2) displays the image/video frames on display 114, and uses the positional audio metadata to pan or locate the transmitted sound such that the transmitted sound is output from the appropriate left and/or right loudspeakers 116A(1)-116A(5), 116B(1)-116B(5) that best correlates with the position of the actively speaking participants 106(4), 106(7) in the image/video frames displayed on display 114 at endpoint 104(2).

For example, using the method 400, the video conference endpoint 104(1) may generate positional audio metadata for the sound/audio 600 originating from actively speaking participant 106(4) and for the sound/audio 610 originating from actively speaking participant 106(7). As previously described, because the microphone assemblies 120A, 120B are each equipped with co-located directional microphones 310(1)-310(4) that have known polar patterns, the microphone assemblies 120A, 120B enable the video conference endpoint 104(1) to accurately determine the sound directions of the actively speaking participants based on the captured sound/audio. For actively speaking participant 106(4), the video conference endpoint 104(1) may have determined, based on the sound/audio 600 captured by microphone assembly 120B, a sound source direction of the sound/audio 600 with respect to the microphone assembly 120B. The video conference endpoint 104(1), using the sounds/audio 600 captured from the microphone array 118 of the video conference endpoint 104(1), may also determine that the actively speaking participant 106(4) is located in tracking confidence region 620 of tracking sector 622. The video conference endpoint 104(1) may have also previously detected each of the head positions of participants 106(1)-106(8), and determined that the detected head positions of participants 106(1)-106(4) are located within tracking sector 622. After comparing the sound source direction of the actively speaking participant 106(4) to a stored sound source direction, the video conference endpoint 104(1) may verify that the detected head position 630 of the actively speaking participant 106(4) corresponds to a stored sound source direction that matches or correlates with the sound source direction detected by microphone assembly 120B and is located within the tracking confidence region 620. The video conference endpoint 104(1) may then update the positional audio metadata to include the coordinates of the detected head position 630 of the actively speaking participant 106(4). As shown in FIG. 6, the video conference endpoint 104(2) may utilize the positional audio metadata to output the captured sound/audio 600 of the actively speaking participant 106(4) from the first left loudspeaker 116A(1), which is the loudspeaker of the video conference endpoint 104(2) that best matches the location of the actively speaking participant 106(4) as displayed by the display 114 of the video conference endpoint 104(2).

Similarly, for actively speaking participant 106(7), the video conference endpoint 104(1) may have detected, based on the sound/audio 610 captured by microphone assembly 120A, a sound source direction from the sound/audio 610 with respect to the microphone assembly 120A. The video conference endpoint 104(1), using the sounds/audio 610 captured from the microphone array 118 of the video conference endpoint 104(1), may determine that the actively speaking participant 106(7) is located in tracking confidence region 640 of tracking sector 642. The video conference endpoint 104(1) may have also previously detected each of the head positions of participants 106(1)-106(8), and determined that the detected head positions of participants 106(5)-106(8) are located within tracking sector 642. After comparing the direction of the actively speaking participant 106(7) to a stored sound source direction for tracking confidence region 640, the video conference endpoint 104(1) may verify that the detected head position 650 of the actively speaking participant 106(7) corresponds to a stored sound source direction that matches the sound source direction detected by microphone assembly 120A and is located within the tracking confidence region 640. The video conference endpoint 104(1) may then update the positional audio metadata to include the coordinates of the detected head position 650 of the actively speaking participant 106(7). As shown in FIG. 6, the video conference endpoint 104(2) may utilize the positional audio metadata to output the captured sound/audio 610 of the actively speaking participant 106(7) from the third right loudspeaker 116B(3), which is the loudspeaker of the video conference endpoint 104(2) that best matches the location of the actively speaking participant 106(7) as displayed by the display 114 of the video conference endpoint 104(2).

Figure 7:
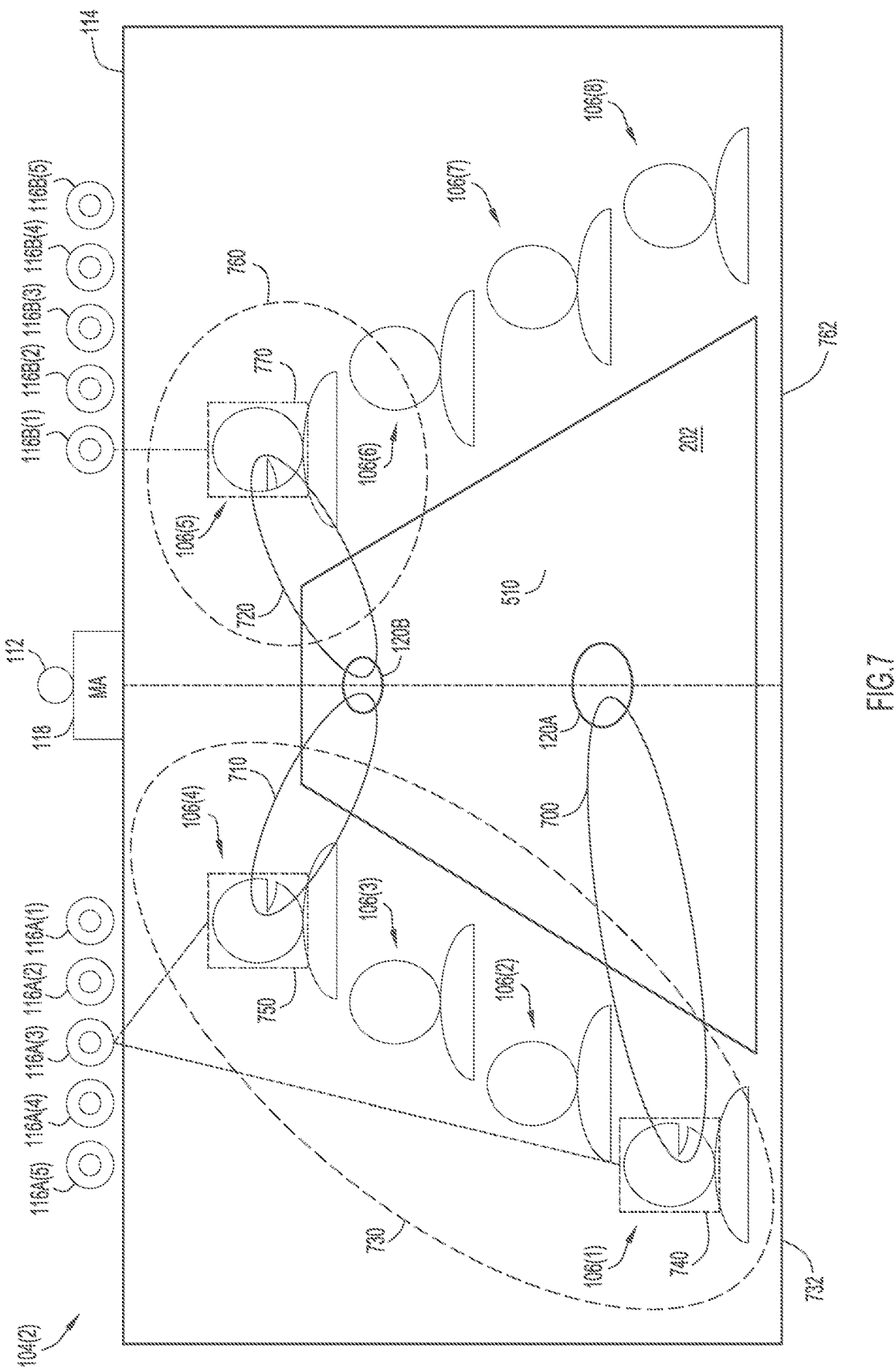
FIG. 7 is an example illustration of the view of the second video conference endpoint of FIG. 2 that is spatially outputting audio relative to the video output based on the positional audio metadata generated by the first video conference endpoint, according to an example embodiment.

Turning to FIG. 7, and with continued reference to FIGS. 2, 3A, 3B, 3C, 4A, 4B, 5A-5C, and 6 illustrated is another example view of the video conference endpoint 104(2) at location B that is utilizing the positional audio metadata generated and transmitted by the video conference endpoint 104(1) to spatially playback the multi-channel audio captured by the video conference endpoint 104(1) in a manner that matches the images/video captured and transmitted by the video conference endpoint 104(2). As shown in FIG. 7, video conference endpoint 104(2) displays the image/video frames on display 114, and uses the positional audio metadata to pan or locate the transmitted multi-channel sound such that the transmitted multi-channel sound is output from the appropriate left and/or right loudspeakers 116A(1)-116A(5), 116B(1)-116B(5) that best correlates with the position of the actively speaking participants 106(1), 106(4), 106(5) in the image/video frames displayed on display 114 at endpoint 104(2).

For example, using the method 400, the video conference endpoint 104(1) may generate positional audio metadata for the sound/audio 700 originating from actively speaking participant 106(1), the sound/audio 710 originating from actively speaking participant 106(4), and the sound/audio 720 originating from actively speaking participant 106(5). During an active collaboration session, the video conference endpoint 104(1) may detect, via microphone assembly 120A, a sound source direction of the sound/audio 700 originated from active speaking participant 106(1) with respect to microphone assembly 120A, while simultaneously detecting, via microphone assembly 120B, a sound source direction from the sound/audio 710 originated from active speaking participant 106(4) (e.g., if participants 106(1) and 106(4) are talking over one another) with respect to microphone assembly 120B. The video conference endpoint 104(1), using the sounds/audio 700, 710 captured from the microphone array 118 of the video conference endpoint 104(1), may determine that the actively speaking participants 106(1), 106(4) are both located in the same tracking confidence region 730 of tracking sector 732. The video conference endpoint 104(1) may have also previously detected each of the head positions of participants 106(1)-106(8), and determined that the detected head positions of participants 106(1)-106(4) are located within tracking sector 732. After comparing the direction of the actively speaking participant 106(1) with respect to the microphone assembly 120A and the direction of the actively speaking participant 106(4) with respect to the microphone assembly 120B to stored sound source directions, the video conference endpoint 104(1) may check to see if the detected head positions 740, 750 of the actively speaking participants 106(1), 106(4), respectively, correspond to stored sound source directions. Because there are two actively speaking participants 106(1), 106(4) in the same tracking confidence region 730, in accordance with method 400, the video conference endpoint may utilize an average position of the detected head positions 740, 750 of the actively speaking participants 106(1), 106(4) for the positional audio metadata. As shown in FIG. 7, the video conference endpoint 104(2) may utilize the positional audio metadata to output the captured multi-channel sound/audio 700, 710 of the actively speaking participants 106(1), 106(4) from the third left loudspeaker 116A(3), which is the loudspeaker of the video conference endpoint 104(2) that is disposed between the actively speaking participants 106(1), 106(4) as displayed by the display 114 of the video conference endpoint 104(2).

For actively speaking participant 106(5), the video conference endpoint 104(1) may have detected a sound source direction relative to microphone assembly 120B from the sound/audio 720 captured by microphone assembly 120B. The video conference endpoint 104(1), using the sound/audio 720 captured from the microphone array 118 of the video conference endpoint 104(1), may determine that the actively speaking participant 106(5) is located in tracking confidence region 760 within tracking sector 762. The video conference endpoint 104(1) may have also previously detected each of the head positions of participants 106(1)-106(8), and determined that the detected head positions of participants 106(5)-106(8) are located within tracking sector 762. After comparing the direction of the actively speaking participant 106(5) to a stored sound source direction for tracking confidence region 760, the video conference endpoint 104(1) may verify that the detected head position 770 of the actively speaking participant 106(5) corresponds to a stored sound source direction that matches the sound source direction detected by the microphone assembly 120B. The video conference endpoint 104(1) may then update the positional audio metadata to include the coordinates of the detected head position 770 of the actively speaking participant 106(5). As shown in FIG. 7, the video conference endpoint 104(2) may utilize the positional audio metadata to output the captured sound/audio 720 of the actively speaking participant 106(5) from the first right loudspeaker 116B(1), which is the loudspeaker of the video conference endpoint 104(2) that best matches the location of the actively speaking participant 106(5) as displayed by the display 114 of the video conference endpoint 104(2).

Figure 8:
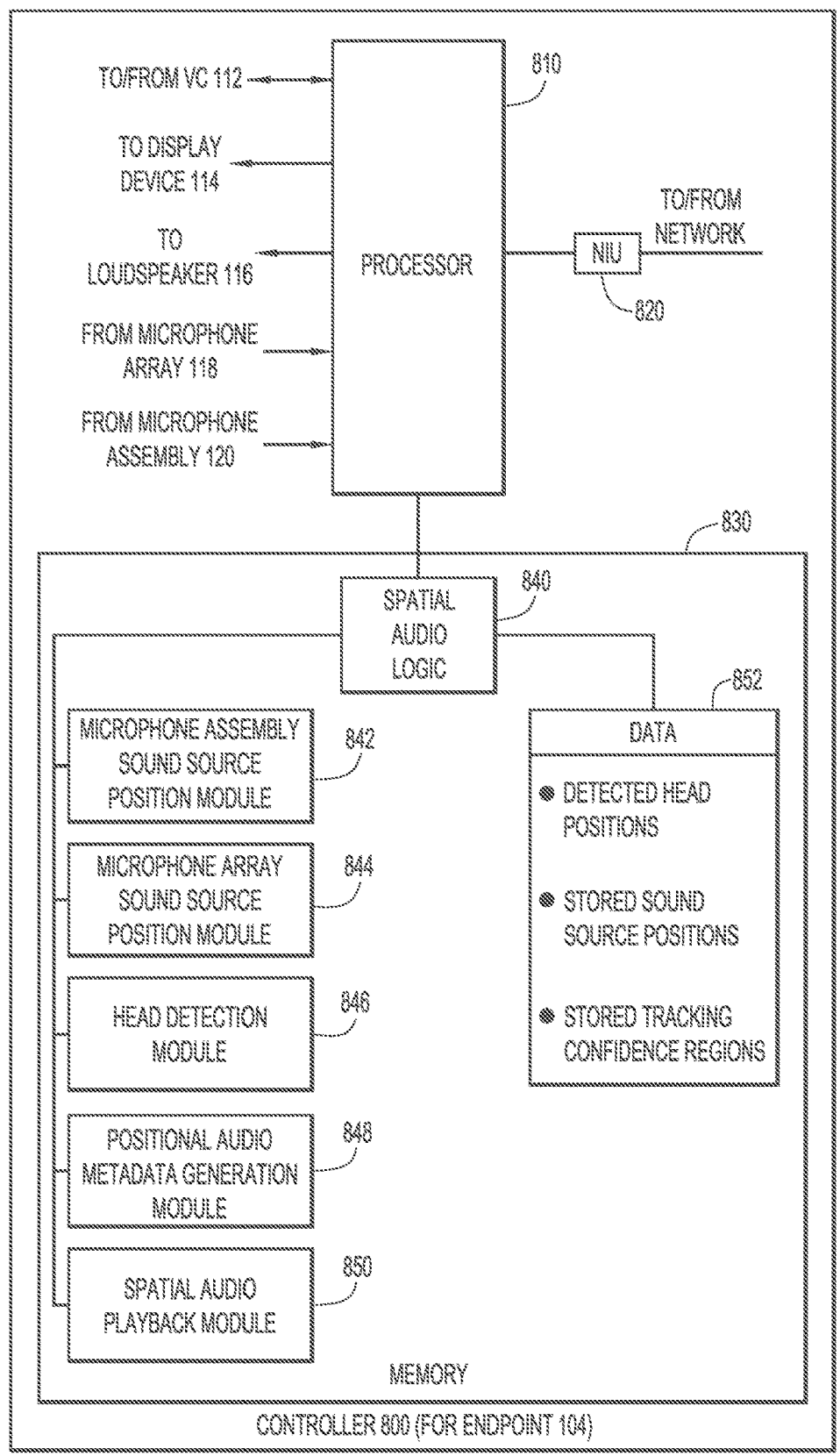
FIG. 8 is a block diagram of a controller for a video conference endpoint configured to perform techniques described herein, according to an embodiment.

Reference is now made to FIG. 8, which shows an example block diagram of a controller 800 of a video conference endpoint 104 configured to perform the techniques for determining the sound source positions with respect to the camera 112 of the video conference endpoint 104, generating positional audio metadata for the sound source positions, and for spatially playing captured audio that matches the captured images/video of the camera 112, according to embodiments described herein. There are numerous possible configurations for controller 800 and FIG. 8 is meant to be an example. Controller 800 includes a processor 810, a network interface unit 820, and memory 830. The network interface (I/F) unit (NIU) 820 is, for example, an Ethernet card or other interface device that allows the controller 800 to communicate over communication network 110. Network I/F unit 820 may include wired and/or wireless connection capability.

Processor 810 may include a collection of microcontrollers and/or microprocessors, for example, each configured to execute respective software instructions stored in the memory 830. The collection of microcontrollers may include, for example: a video controller to receive, send, and process video signals related to video cameras 112 and display devices 114; an audio processor to receive, send, and process audio signals related to loudspeakers 116, microphone arrays 118, and microphone assemblies 120; and a high-level controller to provide overall control. Processor 810 may send pan, tilt, and zoom commands to the video cameras 112, which is responsive to the commands as would be appreciated by one of ordinary skill in the relevant arts. Portions of memory 830 (and the instruction therein) may be integrated with processor 810. In the transmit direction, processor 810 encodes audio/video captured by video cameras 112, microphone arrays 118, and microphone assemblies 120, encodes the captured audio/video into data packets, encodes the indication of the active content into packets, and causes the encoded data packets to be transmitted to communication network 110. In a receive direction, processor 810 decodes audio/video from data packets received from communication network 110 and causes the audio/video to be presented to local participants via display devices 114 and loudspeakers 116.

The memory 830 may include read only memory (ROM), random access memory (RAM), magnetic disk storage media devices, optical storage media devices, flash memory devices, electrical, optical, or other physical/tangible (e.g., non-transitory) memory storage devices. Thus, in general, the memory 830 may comprise one or more computer readable storage media (e.g., a memory device) encoded with software comprising computer executable instructions and when the software is executed (by the processor 810) it is operable to perform the operations described herein. For example, the memory 830 stores or is encoded with instructions for spatial audio logic 840 that facilitates the generation of positional audio metadata that represents the spatial coordinates of the sound source with respect to the camera 112, and that facilitates spatial audio playback of the captured sound/audio such that the sound/audio may be output by a video conference endpoint at locations that correspond to and/or match the image/video output. Spatial audio logic 840 includes microphone assembly sound source position module 842 configured to detect a sound direction with respect to a microphone assembly and calculate the sound source position with respect to components of the video conference endpoint 104, a microphone array sound source position module 844 configured to detect a sound direction with respect to a microphone array, calculate the sound source position with respect to components of the video conference endpoint 104, and establish the confidence region of an image/video output of the camera 112 of the video conference endpoint 104, a head detection module 846 configured to locate and position heads of participants present in the image/video output of the camera 112 of the video conference endpoint 104, a positional audio metadata generation module 848 configured to generate positional audio metadata (e.g., coordinates) of the position of the sound sources with respect to the image/video output of the camera of the video conference endpoint 104, and a spatial audio playback module 850 configured to utilize the positional audio metadata received from another video conference endpoint to spatially playback the sound/audio received from the other video conference endpoint so that the sound/audio may be output at a location the corresponds with the image/video displayed on the display 114.

In addition, memory 830 stores data 852 used and generated by logic/modules 840-850, including, but not limited to: information associated with detected head positions; stored sound source positions; stored tracking confidence regions; etc.

Figure 9:
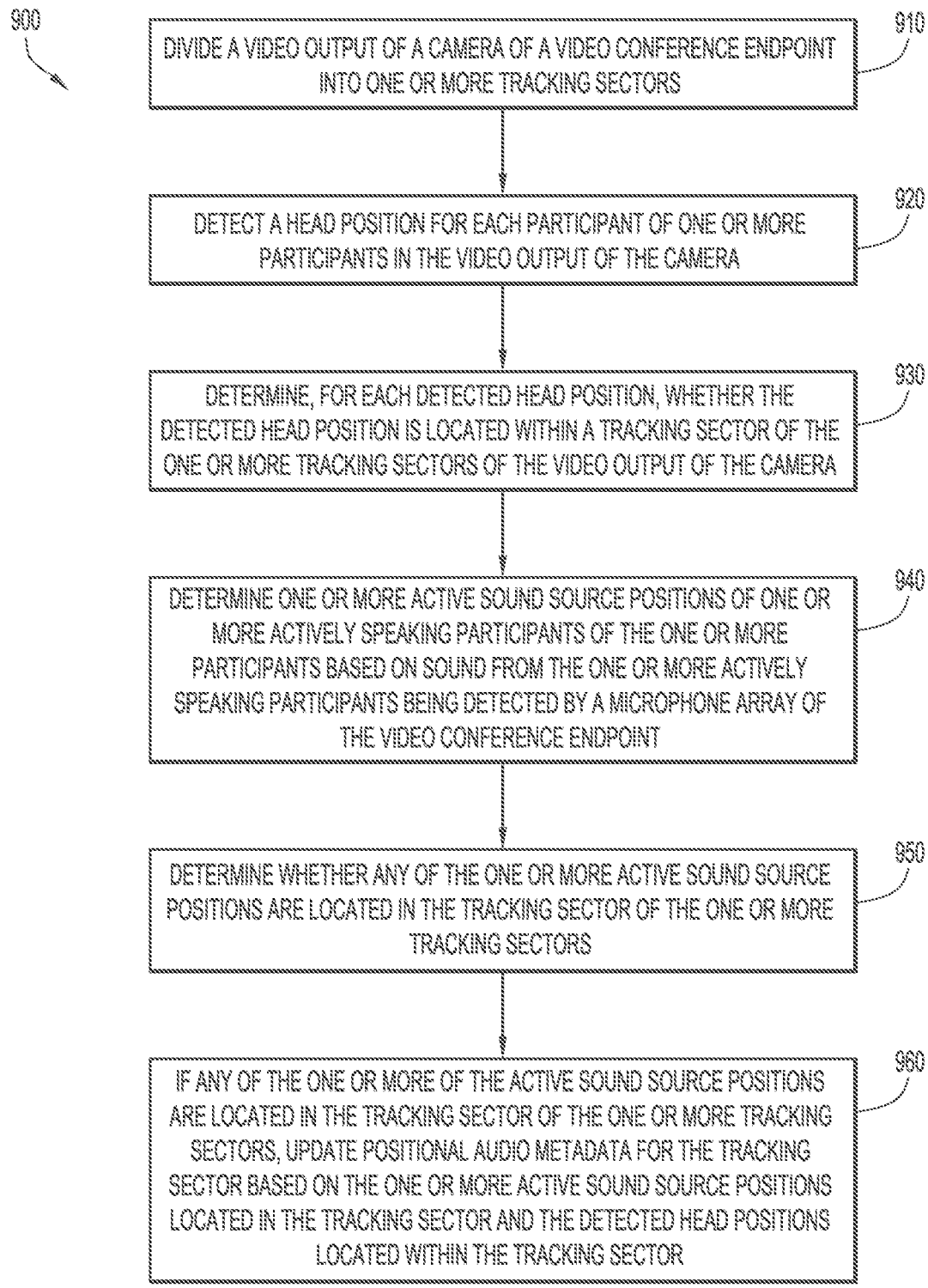
FIG. 9 is a flowchart of a method of generating the positional audio metadata, according to an example embodiment.

With reference to FIG. 9, illustrated is a flowchart of a method 900 performed by the video conference endpoint 104 to generate the positional audio metadata for the sound/audio captured of the video conference endpoint 104. Reference is also made to FIGS. 2, 3A-3C, 4A, 4B, 5A-5C, 6, and 7 for purposes of the description of FIG. 9. At 910, the video conference endpoint 104 may divide a video output of the camera 112 of the video conference endpoint 104(1) into one or more tracking sectors. As previously explained with regard to FIGS. 5A-5C, the video output 500 may be divided into a first tracking sector 505 and a second tracking sector 510. As similarly explained previously with regard to FIGS. 6 and 7, the video output received by a far-end video conference endpoint 104(2) may have been divided into a first tracking sector 622, 732, and a second tracking sector 642, 762. While the illustrated examples illustrate dividing the video output of the camera 112 into two tracking sectors, the video conference endpoint 104 may divide a video output of the camera 112 into any number of tracking sectors.

At 920, the video conference endpoint 104(1) may then detect a head position for each participant of the one or more participants in the video output of the camera 112 of the video conference endpoint 104(1). At 930, the video conference endpoint 104(1) may determine, for each detected head position, whether the detected head position is located within a tracking sector of the one or more tracking sectors of the video output of the camera 112. As explained above with regard to FIGS. 5A-5C, 6, and 7, the video conference endpoint 104(1) may detect the head positions of each of the participants 106(1)-106(8) seated around table 202, and may determine that the detected head positions of participants 106(1)-106(4) are located in the first tracking sector 505, 622, 732, and that the detected head positions of participants 106(5)-106(8) are located in the second tracking sector 510, 642, 762.

At 940, the video conference endpoint 104(1) may determine one or more active sound source positions of one or more actively speaking participants 106(1)-106(8) of the one or more participants 106(1)-106(8) with respect to the camera 112 of the video conference endpoint 104(1) based on sound from one or more actively speaking participants 106 being captured or detected by the microphone array 118 of the video conference endpoint 104(1). As previously explained, each microphone array 118 may be configured to capture or detect the sound/audio emitted by an actively speaking participant 106(1)-106(8), and the video conference endpoint 104(1) may be able to determine the position of the sound source with respect to the microphone array 118. Because the various components of the video conference endpoint 104(1) have known spatial relationships to one another, once the position of the sound source with respect to the microphone array 118 is known, the position of the sound source with respect to the other components (e.g., the camera 112) of the video conference endpoint 104(1) may also be known. At 950, the video conference endpoint 104(1) may then determine whether any of the one or more active sound source positions are located in the tracking sector of the one or more tracking sectors. As previously explained with regard to FIG. 5A-5C, the video conference endpoint 104(1) may determine that the active sound source positions 515 are located in the first tracking sector 505, and may determine that the active sound source positions 540 are located in the second tracking sector 510.

At 960, the video conference endpoint 104(1) may, if any of the one or more active sound source positions are located in the tracking sector of the one or more tracking sectors, update the positional audio metadata for the tracking sector based on the one or more active sound source positions located in the tracking sector and the detected head positions located within the tracking sector. As previously described with reference to FIGS. 4A, 4B, 5A-5C, 6, and 7, the video conference endpoint 104(1) uses the active sound source positions 515, 540 to determine tracking confidence regions 525, 530, 545, 620, 640, 730, 760. Once the tracking confidence regions 525, 530, 545, 620, 640, 730, 760 have been determined, the video conference endpoint 104(1) may determine if any detected head positions 520, 550, 630, 650, 740, 750, 770 are located within the tracking confidence regions 525, 530, 545, 620, 640, 730, 760. If detected head positions are located in the tracking confidence regions 525, 530, 545, 620, 640, 730, 760, the video conference endpoint 104(1) may then compare secondary active sound source directions detected by a microphone assembly 120A, 120B to one or more stored sound source directions associated with the tracking confidence regions 525, 530, 545, 620, 640, 730, 760 to determine if a matching stored sound source direction and associated sound source position exists. As previously explained with regard to FIGS. 4A and 4B, each of the stored sound source directions may be associated with a location/position of a previously captured sound source (e.g., previously detected actively speaking participant). As further explained with regard to FIGS. 4A and 4B, depending on whether or not a matching sound source direction exists, the video conference endpoint 104(1) may update the positional audio metadata for a particular tracking sector 505, 510, 622, 642, 732, 762 at least partially based on the one or more detected head positions in the tracking sector 505, 510, 622, 642, 732, 762.

Techniques presented herein enable a first or near-end video conference endpoint to automatically generate positional audio metadata that represents the positions of the actively speaking participants with respect to the camera of the first video conference endpoint. The positional audio metadata may be utilized by secondary or far-end video conference endpoints participating in an active collaboration session with the first video conference endpoint to support spatial audio playback of the audio received from the first video conference endpoint. The techniques presented herein allow for a more responsive updating of the positional metadata when compared to conventional sound source detection/capturing techniques. Moreover, the techniques presented herein may be able to more accurately reflect the actual sound source location or position within the images/video output by the camera, which is especially important for the participants located farthest from the first video conference endpoint 104(1).

In summary, in one form, a method is provided comprising: at a video conference endpoint including a camera and a microphone array: dividing a video output of the camera into one or more tracking sectors; detecting a head position for each participant of one or more participants in the video output of the camera; determining, for each detected head position, whether the detected head position is located within a tracking sector of the one or more tracking sectors of the video output of the camera; determining one or more active sound source positions of one or more actively speaking participants of the one or more participants based on sound from the one or more actively speaking participants being captured by the microphone array; determining whether any of the one or more active sound source positions are located in the tracking sector of the one or more tracking sectors; and if any of the one or more of the active sound source positions are located in the tracking sector of the one or more tracking sectors, updating positional audio metadata for the tracking sector based on the one or more active sound source positions located in the tracking sector and the detected head positions located within the tracking sector.

In another form, an apparatus is provided comprising: a camera; a microphone array; and a processor coupled to the microphone array and the camera, and configure to: divide a video output of the camera into one or more tracking sectors; detect a head position for each participant of one or more participants in the video output of the camera; determine, for each detected head position, whether the detected head position is located within a tracking sector of the one or more tracking sectors of the video output of the camera; determine one or more active sound source positions of one or more actively speaking participants of the one or more participants based on sound from the one or more actively speaking participants being captured by the microphone array; determine whether any of the one or more active sound source positions are located in the tracking sector of the one or more tracking sectors; if any of the one or more of the active sound source positions are located in the tracking sector of the one or more tracking sectors, update positional audio metadata for the tracking sector based on the one or more active sound source positions located in the tracking sector and the detected head positions located within the tracking sector.

In yet another form, a (non-transitory) processor readable medium is provided. The medium stores instructions that, when executed by a processor, cause the processor to: divide a video output of a camera of a video conference endpoint into one or more tracking sectors; detect a head position for each participant of one or more participants in the video output of the camera; determine, for each detected head position, whether the detected head position is located within a tracking sector of the one or more tracking sectors of the video output of the camera; determine one or more active sound source positions of one or more actively speaking participants of the one or more participants based on sound from the one or more actively speaking participants being captured by a microphone array of the video conference endpoint; determine whether any of the one or more active sound source positions are located in the tracking sector of the one or more tracking sectors; if any of the one or more of the active sound source positions are located in the tracking sector of the one or more tracking sectors, update positional audio metadata for the tracking sector based on the one or more active sound source positions located in the tracking sector and the detected head positions located within the tracking sector.

The above description is intended by way of example only. Various modifications and structural changes may be made therein without departing from the scope of the concepts described herein and within the scope and range of equivalents of the claims.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)). The use of the terms "capture" and "captured" with respect to the microphone arrays and microphone assemblies are also intended to mean that the microphone arrays/assemblies detect or pick-up a sound or audible output from a sound source.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   at a video conference endpoint including a camera and a microphone array:
      dividing a video output of the camera into one or more tracking sectors;
      detecting a head position for each participant of one or more participants in the video output of the camera;
      determining, for each detected head position, whether the detected head position is located within a tracking sector of the one or more tracking sectors of the video output of the camera;
      determining one or more active sound source positions of one or more actively speaking participants of the one or more participants based on sound from the one or more actively speaking participants being detected by the microphone array;
      determining whether any of the one or more active sound source positions are located in the tracking sector of the one or more tracking sectors; and
      if any of the one or more active sound source positions are located in the tracking sector of the one or more tracking sectors, updating positional audio metadata for the tracking sector based on the one or more active sound source positions located in the tracking sector and the detected head positions located within the tracking sector.

2. The method of claim 1, further comprising:
   if any of the one or more active sound source positions are located in the tracking sector of the one or more tracking sectors, determining a tracking confidence region for the tracking sector based on the one or more active sound source positions located in the tracking sector; and
   determining if any of the detected head positions in the tracking sector of the one or more tracking sectors are located within the tracking confidence region.

3. The method of claim 2, wherein the video conference endpoint is associated with at least one microphone assembly, wherein the one or more active sound source positions are one or more primary active sound source positions, and wherein the method further comprises:
   determining one or more active sound source directions of the one or more actively speaking participants based on sound from the one or more actively speaking participants being detected by the at least one microphone assembly.

4. The method of claim 3, the method further comprising:
   if at least one detected head position in the tracking sector of the one or more tracking sectors is located within the tracking confidence region, comparing at least one of the one or more active sound source directions to one or more stored sound source directions for the tracking confidence region to determine a matching stored sound source direction, each of the one or more stored sound source directions having an associated sound source position that represents previously determined sound source positions of previous active speaking participants associated with the tracking confidence region.

5. The method of claim 4, wherein:
   if the at least one of the one or more active sound source direction matches one of the one or more stored sound source directions and if a number of detected head positions located within the tracking confidence region is equal to one, the updating the positional audio metadata for the tracking sector comprises updating the positional audio metadata to use the location of the detected head position located within the tracking confidence region; and
   if the at least one of the one or more active sound source direction matches one of the one or more stored sound source directions and if the number of detected head positions located within the tracking confidence region is greater than one, the updating the positional audio metadata for the tracking sector comprises updating the positional audio metadata to use one of the detected head positions that correlates with an associated sound source position of the matching stored sound source direction.

6. The method of claim 4, wherein, if none of the one or more active sound source directions match the one or more stored sound source directions, the method further comprises:
  determining if any of the one or more stored sound source directions correspond with the tracking confidence region; and
  if any of the one or more stored sound source directions correspond with the tracking confidence region, the method further comprises:
    narrowing the detected head positions for the tracking confidence region to a set of plausible detected head positions for the tracking confidence region based on the one or more stored sound source directions and one or more associated sound source positions that correspond with the tracking confidence region;
    wherein if the set of plausible detected head positions contains only one plausible detected head position, the updating the positional audio metadata for the tracking sector comprises updating the positional audio metadata to use the plausible detected head position; and
    wherein if the set of plausible detected head positions contains more than one plausible detected head position, the updating the positional audio metadata for the tracking sector comprises updating the positional audio metadata to use an average position of the plausible detected head positions.

7. The method of claim 1, wherein the video conference endpoint is a first video conference endpoint, the method further comprising:
  transmitting the positional audio metadata to a second video conference endpoint collaborating with the first video conference endpoint.

8. An apparatus comprising:
  a camera;
  a microphone array; and
  a processor coupled to the microphone array and the camera, and configure to:
    divide a video output of the camera into one or more tracking sectors;
    detect a head position for each participant of one or more participants in the video output of the camera;
    determine, for each detected head position, whether the detected head position is located within a tracking sector of the one or more tracking sectors of the video output of the camera;
    determine one or more active sound source positions of one or more actively speaking participants of the one or more participants based on sound from the one or more actively speaking participants being detected by the microphone array;
    determine whether any of the one or more active sound source positions are located in the tracking sector of the one or more tracking sectors; and
    if any of the one or more active sound source positions are located in the tracking sector of the one or more tracking sectors, update positional audio metadata for the tracking sector based on the one or more active sound source positions located in the tracking sector and the detected head positions located within the tracking sector.

9. The apparatus of claim 8, wherein the processor is further configured to:
  if any of the one or more active sound source positions are located in the tracking sector of the one or more tracking sectors, determine a tracking confidence region for the tracking sector based on the one or more active sound source positions located in the tracking sector; and
  determine if any of the detected head positions in the tracking sector of the one or more tracking sectors are located within the tracking confidence region.

10. The apparatus of claim 9, wherein the apparatus further comprises at least one microphone assembly, wherein the one or more active sound source positions are one or more primary active sound source positions, and wherein the processor is further configured to:
  determine one or more active sound source directions of the one or more actively speaking participants based on sound from the one or more actively speaking participants being detected by the at least one microphone assembly.

11. The apparatus of claim 10, wherein the processor is further configured to:
  if at least one detected head position in the tracking sector of the one or more tracking sectors is located within the tracking confidence region, compare at least one of the one or more active sound source directions to one or more stored sound source directions to determine a matching stored sound source direction, each of the one or more stored sound source directions having an associated sound source position that represents previously determined sound source positions of previous active speaking participants associated with the tracking confidence region.

12. The apparatus of claim 11, wherein:
  if the at least one of the one or more active sound source direction matches one of the one or more stored sound source directions and if a number of detected head positions located within the tracking confidence region is equal to one, the processor is configured to update the positional audio metadata for the tracking sector of the one or more tracking sectors by updating the positional audio metadata to use the location of the detected head position located within the tracking confidence region; and
  if the at least one of the one or more active sound source direction matches one of the one or more stored sound source directions and if the number of detected head positions located within the tracking confidence region is greater than one, the processor is configured to update the positional audio metadata for the tracking sector of the one or more tracking sectors by updating the positional audio metadata to use one of the detected head positions that correlates with an associated sound source position of the matching stored sound source direction.

13. The apparatus of claim 11, wherein, if none of the one or more active sound source directions match the one or more stored sound source directions, the processor is further configured to:
  determine if any of the one or more stored sound source directions correspond with the tracking confidence region; and
  if any of the one or more stored sound source directions correspond with the tracking confidence region, the processor is further configured to:

narrow the detected head positions for the tracking confidence region to a set of plausible detected head positions for the tracking confidence region based on the one or more stored sound source directions and one or more associated sound source positions that correspond with the tracking confidence region;

wherein, if the set of plausible detected head positions contains only one plausible detected head position, the processor is configured to update the positional audio metadata for the tracking sector of the one or more tracking sectors by updating the positional audio metadata to use the plausible detected head position; and wherein, if the set of plausible detected head positions contains more than one plausible detected head position, the processor is configured to update the positional audio metadata for the tracking sector of the one or more tracking sectors by updating the positional audio metadata to use an average position of the plausible detected head positions.

14. The apparatus of claim 9, wherein the processor is further configured to:
transmit the positional audio metadata to a far-end video conference endpoint.

15. One or more non-transitory computer readable storage media encoded with instructions that, when executed by a processor, cause the processor to:
divide a video output of a camera of a video conference endpoint into one or more tracking sectors;
detect a head position for each participant of one or more participants in the video output of the camera;
determine, for each detected head position, whether the detected head position is located within a tracking sector of the one or more tracking sectors of the video output of the camera;
determine one or more active sound source positions of one or more actively speaking participants of the one or more participants based on sound from the one or more actively speaking participants being detected by a microphone array of the video conference endpoint;
determine whether any of the one or more active sound source positions are located in the tracking sector of the one or more tracking sectors; and
if any of the one or more active sound source positions are located in the tracking sector of the one or more tracking sectors, update positional audio metadata for the tracking sector based on the one or more active sound source positions located in the tracking sector and the detected head positions located within the tracking sector.

16. The non-transitory computer readable storage media of claim 15, wherein the processor is further configured to:
if any of the one or more active sound source positions are located in the tracking sector of the one or more tracking sectors, determine a tracking confidence region for the tracking sector based on the one or more active sound source positions located in the tracking sector; and
determine if any of the detected head positions in the tracking sector of the one or more tracking sectors are located within the tracking confidence region.

17. The non-transitory computer readable storage media of claim 16, wherein the video conference endpoint further comprises at least one microphone assembly, wherein the one or more active sound source positions are one or more primary active sound source positions, and wherein the processor is further configured to:
determine one or more active sound source directions of the one or more actively speaking participants based on sound from the one or more actively speaking participants being detected by the at least one microphone assembly.

18. The non-transitory computer readable storage media of claim 17, wherein the processor is further configured to:
if at least one detected head position in the tracking sector of the one or more tracking sectors is located within the tracking confidence region, compare at least one of the one or more active sound source directions to one or more stored sound source directions to determine a matching stored sound source direction, each of the one or more stored sound source direction having an associated sound source position that represents previously determined sound source positions of previous active speaking participants associated with the tracking confidence region.

19. The non-transitory computer readable storage media of claim 18, wherein
if the at least one of the one or more active sound source direction matches one of the one or more stored sound source directions and if a number of detected head positions located within the tracking confidence region is equal to one, the update of the positional audio metadata for the tracking sector of the one or more tracking sectors comprises updating the positional audio metadata to use the location of the detected head position located within the tracking confidence region; and
if the at least one of the one or more active sound source direction matches one of the one or more stored sound source directions and if the number of detected head positions located within the tracking confidence region is greater than one, the update of the positional audio metadata for the tracking sector of the one or more tracking sectors comprises updating the positional audio metadata to use one of the detected head positions that correlates with an associated sound source position of the matching stored sound source direction.

20. The non-transitory computer readable storage media of claim 18, wherein, if none of the one or more active sound source directions match the one or more stored sound source directions, the processor is further configured to:
determine if any of the one or more stored sound source directions correspond with the tracking confidence region; and
if any of the one or more stored sound source directions correspond with the tracking confidence region, the processor is further configured to:
narrow the detected head positions for the tracking confidence region to a set of plausible detected head positions for the tracking confidence region based on the one or more stored sound source directions and one or more associated sound source positions that correspond with the tracking confidence region;
wherein, if the set of plausible detected head positions contains only one plausible detected head position, the update of the positional audio metadata for the tracking sector of the one or more tracking sectors comprises updating the positional audio metadata to use the plausible detected head position; and
wherein, if the set of plausible detected head positions contains more than one plausible detected head position, the updating the positional audio metadata for the tracking sector of the one or more tracking sectors comprises updating the positional audio metadata to use an average position of the plausible detected head positions.

\* \* \* \* \*